(12) United States Patent
Seki et al.

(10) Patent No.: US 9,874,829 B2
(45) Date of Patent: Jan. 23, 2018

(54) DISPERSANT FOR LIQUID DEVELOPMENT, LIQUID DEVELOPER, LIQUID DEVELOPER CARTRIDGE, IMAGE FORMING APPARATUS, AND IMAGE FORMING METHOD

(71) Applicant: FUJI XEROX CO., LTD., Tokyo (JP)

(72) Inventors: Mieko Seki, Kanagawa (JP); Yasuo Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/223,743

(22) Filed: Jul. 29, 2016

(65) Prior Publication Data
US 2017/0277055 A1    Sep. 28, 2017

(30) Foreign Application Priority Data
Mar. 25, 2016 (JP) ................. 2016-062253

(51) Int. Cl.
G03G 9/135 (2006.01)
G03G 9/13 (2006.01)
C08G 75/045 (2016.01)
G03G 15/10 (2006.01)

(52) U.S. Cl.
CPC ........... *G03G 9/132* (2013.01); *C08G 75/045* (2013.01); *G03G 15/10* (2013.01)

(58) Field of Classification Search
CPC .............................. G03G 9/1355; G03G 9/135
See application file for complete search history.

(56) References Cited

U.S. PATENT DOCUMENTS

2008/0241485 A1\* 10/2008 Shimohara ........... C09D 11/101
428/195.1
2015/0166816 A1\* 6/2015 Arayama ................. C09D 4/00
524/556

FOREIGN PATENT DOCUMENTS

JP    2006-309195 A    11/2006
JP    2010-091704 A    4/2010
JP    2012-113123 A    6/2012

\* cited by examiner

*Primary Examiner* — Hoa V Le
(74) *Attorney, Agent, or Firm* — Oliff PLC

(57) ABSTRACT

Provided is a dispersant for liquid development represented by general formula (1):

General formula (1)

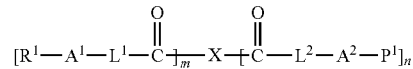

where $R^1$ represents a monovalent organic group having a polar group, $A^1$ and $A^2$ each represent an oxygen or sulfur atom, $L^1$ and $L^2$ each represent a divalent organic linking group, X represents a (m+n)-valent organic linking group having an alkyleneoxy group, $P^1$ represents a polymer chain containing a unit represented by general formula (2), and m and n each represent a number of 1 to 9, with m+n being an integer of 2 to 10:

General formula (2)

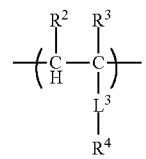

where $R^2$ and $R^3$ each represent a hydrogen atom or a methyl group, $L^3$ represents a carbonyloxy, oxycarbonyl, carbonyl, or phenylene group, and $R^4$ represents a monovalent organic group having at least one selected from a carboxy group, a polyoxyalkylene group, an amino group, a sulfo group, and derivatives of the foregoing.

20 Claims, 2 Drawing Sheets

DISPERSANT FOR LIQUID DEVELOPMENT, LIQUID DEVELOPER, LIQUID DEVELOPER CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2016-062253 filed Mar. 25, 2016.

BACKGROUND

Technical Field

The present invention relates to a dispersant for liquid development, a liquid developer, a liquid developer cartridge, an image forming apparatus, and an image forming method.

SUMMARY

According to an aspect of the invention, there is provided a dispersant for liquid development represented by general formula (1) below:

General formula (1)

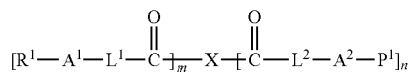

In general formula (1), $R^1$ represents a monovalent organic group having a polar group, $A^1$ and $A^2$ each independently represent an oxygen atom or a sulfur atom, $L^1$ and $L^2$ each independently represent a divalent organic linking group, X represents a (m+n)-valent organic linking group having an alkyleneoxy group, $P^1$ represents a polymer chain that contains a unit represented by general formula (2) below, m represents a number of 1 or more and 9 or less, n represents a number of 1 or more and 9 or less, and m+n is an integer of 2 or more and 10 or less:

General formula (2)

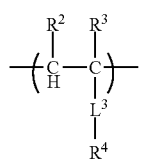

In general formula (2), $R^2$ and $R^3$ each independently represent a hydrogen atom or a methyl group, $L^3$ represents a carbonyloxy group, an oxycarbonyl group, a carbonyl group, an ether bond, or a phenylene group, and $R^4$ represents a monovalent organic group that has at least one selected from a carboxy group and a salt thereof, a polyoxyalkylene group, an amino group, a sulfo group and a salt thereof, and derivatives of the foregoing.

BRIEF DESCRIPTION OF THE DRAWINGS

Exemplary embodiments of the present invention will be described in detail based on the following figures, wherein.

DETAILED DESCRIPTION

Figure 1:
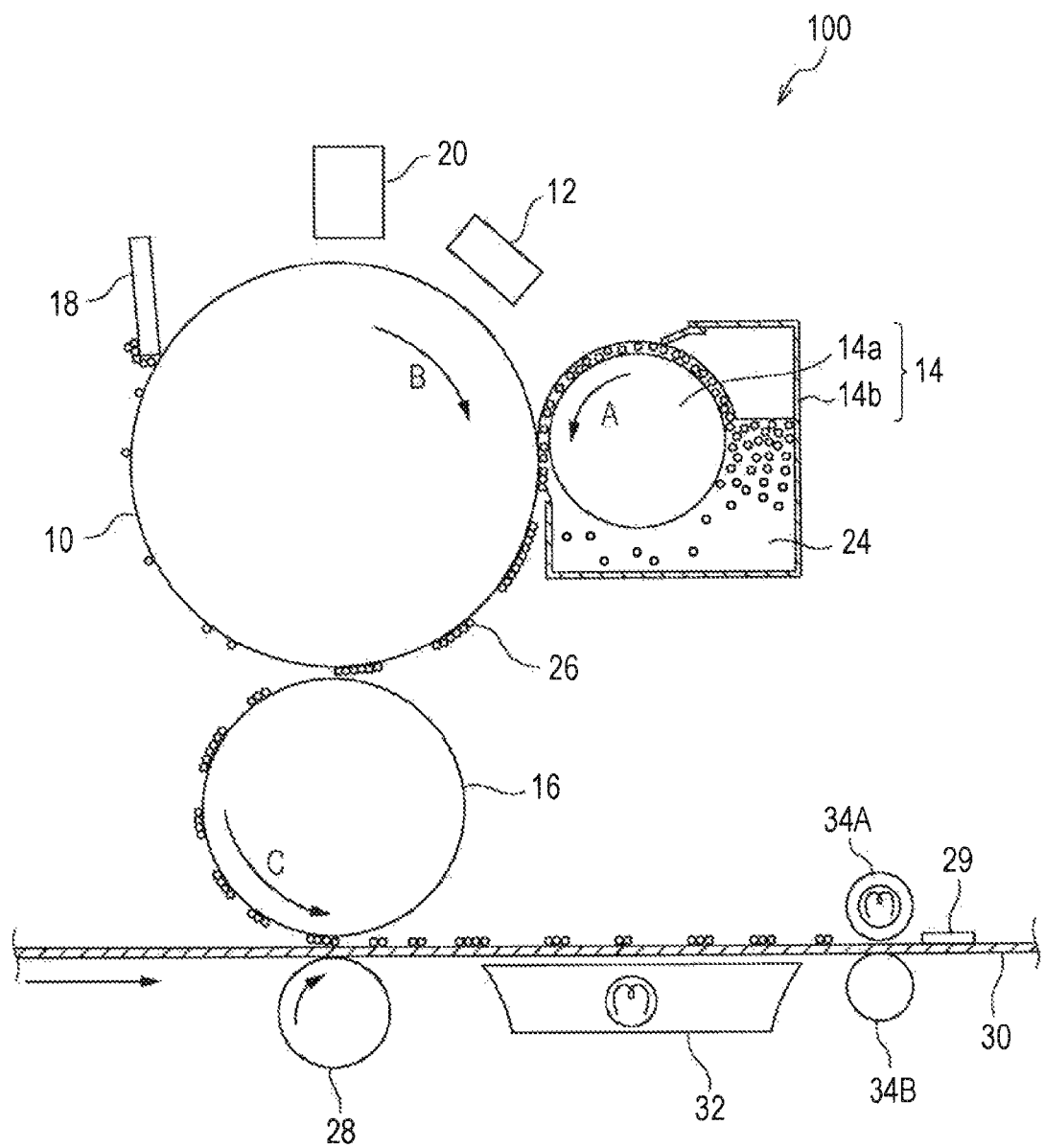
FIG. 1 is a schematic diagram illustrating one example of an image forming apparatus of an exemplary embodiment.

Exemplary embodiments, which are illustrative examples of the present invention, will now be described.

Dispersant for Liquid Development

The dispersant for liquid development according to an exemplary embodiment (hereinafter may be simply referred to as a dispersant) is a dispersant represented by general formula (1) below:

General formula (1)

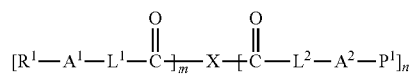

In general formula (1), $R^1$ represents a monovalent organic group having a polar group, $A^1$ and $A^2$ each independently represent an oxygen atom or a sulfur atom, $L^1$ and $L^2$ each independently represent a divalent organic linking group, X represents an (m+n)-valent organic linking group having an alkyleneoxy group, $P^1$ represents a polymer chain that contains a unit represented by general formula (2) below, m represents a number of 1 or more and 9 or less, n represents a number of 1 or more and 9 or less, and m+n is an integer of 2 or more and 10 or less.

General formula (2)

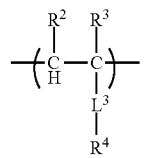

In general formula (2), $R^2$ and $R^3$ each independently represent a hydrogen atom or a methyl group, $L^3$ represents a carbonyloxy group, an oxycarbonyl group, a carbonyl group, an ether bond, or a phenylene group, $R^4$ represents a monovalent organic group that has at least one selected from a carboxy group and a salt thereof, a polyoxyalkylene group, an amino group, a sulfo group and a salt thereof, and derivatives of the foregoing.

When the dispersant having the features described above is used in a liquid developer, a liquid developer that enhances adhesion of a fixed image to a resin recording medium is obtained. The reason for this is not clear but is presumed to be as follows.

That is, the polar group contained in the organic group represented by $R^1$ in general formula (1) is presumed to have high affinity to toner particles and the terminal group of a side chain of the polymer chain represented by $P^1$ (that is, "at least one selected from a carboxy group and a salt thereof, a polyoxyalkylene group, an amino group, a sulfo group and a salt thereof, and derivatives of the foregoing" contained in the organic group represented by $R^4$ in general formula (2)) is presumed to have high affinity to the resin that constitutes the recording medium. In other words, the dispersant according to this exemplary embodiment contains both a group that has high affinity to toner particles and a group that has high affinity to the resin that constitutes the recording medium. Thus, presumably, high adhesion between the fixed image and the recording medium is obtained even when the dispersant comes between the fixed image and the recording medium.

The at least one group "selected from a carboxy group and a salt thereof, a polyoxyalkylene group, an amino group, a sulfo group and a salt thereof, and derivatives of the foregoing" contained in the organic group represented by $R^4$ in general formula (2) may be simply referred to as an "adhesive functional group".

A dispersant according to an exemplary embodiment will now be described.

The organic group represented by $R^1$ in general formula (1) is a monovalent organic group having a polar group. When m in general formula (1) is 2 or more, m $R^1$ groups may be the same or different, and, from the viewpoint of ease of synthesis, may represent the same group.

The number of polar groups contained in the organic group represented by $R^1$ in general formula (1) is not particularly limited and may be 1 or more than 1. When 2 or more polar groups are contained in the organic group represented by $R^1$ in general formula (1), the two or more polar groups may be the same or different.

The number of polar groups contained in the organic group represented by $R^1$ in general formula (1) is, for example, 1 or more and 7 or less, 2 or more and 7 or less, or 2 or more and 4 or less.

The total number of polar groups contained in m organic groups represented by $R^1$ in general formula (1) (hereinafter this number may be referred to as the "total number of polar groups of m $R^1$ groups") may be 2 or more from the viewpoint of affinity to toner particles.

The "total number of polar groups of m $R^1$ group" is expressed by m×total number of polar groups contained in one $R^1$ group. Specifically, when one organic group represented by $R^1$ in general formula (1) contains 2 polar groups and m represents 3.5, the "total number of polar groups of m $R^1$ group" is 7.

For example, the "total number of polar groups of m $R^1$ group" is 2 or more and 20 or less, and may be 4 or more and 15 or less or 6 or more and 8 or less from the viewpoint of affinity to the toner particles.

When the "total number of polar groups of m $R^1$ group" is 2 or more, the two or more polar groups contained in all m organic groups represented by $R^1$ may be the same group or different groups.

The polar group contained in the organic group represented by $R^1$ in general formula (1) may be an acidic polar group, a neutral polar group, or a basic polar group.

Examples of the acidic polar group include acid radicals such as a carboxy group, a carboxylate group, a sulfo group, a sulfonate group, a phosphoric acid group, a phosphate group, a formyl group, and a phenol group (phenolic hydroxyl group).

Examples of the neutral polar groups include neutral groups such as a hydroxy group, an amide group, and a cyano group.

Examples of the basic polar group include basic groups such as an amino group, an imino group, and a quaternary ammonium group.

From the viewpoint of affinity to the toner particles, the polar group may be an acidic polar group, in particular, a carboxy group.

Examples of the organic group represented by $R^1$ in general formula (1) include groups represented by general formulae (R1-1) to (R1-3) below:

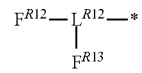

General formula (R1-1)

In general formula (R1-1), $F^{R11}$ represents a polar group, $L^{R11}$ represents a divalent organic linking group, and * indicates the position at which the group is bonded to $A^1$ in general formula (1).

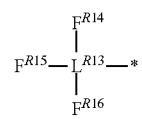

General formula (R1-2)

In general formula (R1-2), $F^{R12}$ and $F^{R13}$ each independently represent a polar group, $L^{R12}$ represents a trivalent organic linking group having 2 or more carbon atoms, and * indicates the position at which the group is bonded to $A^1$ in general formula (1).

$$F^{R15}-\underset{\underset{F^{R16}}{|}}{\overset{\overset{F^{R14}}{|}}{L^{R13}}}-*$$

General formula (R1-3)

In general formula (R1-3), $F^{R14}$, $F^{R15}$, and $F^{R16}$ each independently represent a polar group, $L^{R13}$ represents a tetravalent organic linking group having 3 or more carbon atoms, and * indicates the position at which the group is bonded to $A^1$ in general formula (1).

Specific examples of the polar group represented by $F^{R11}$, $F^{R12}$, or $F^{R13}$ in general formula (R1-1), (R1-2), or (R1-3) are as described above.

The polar group represented by $F^{R11}$ in general formula (R1-1) is directly bonded to a carbon atom of the organic linking group represented by $L^{R11}$.

The polar groups represented by $F^{R12}$ and $F^{R13}$ in general formula (R1-2) are directly bonded to different carbon atoms among the carbon atoms of the organic linking group represented by $L^{R12}$.

The polar groups represented by $F^{R14}$, $F^{R15}$, and $F^{R16}$ in general formula (R1-3) are also directly bonded to different carbon atoms among the carbon atoms of the organic linking group represented by $L^{R13}$.

Examples of the divalent organic linking group represented by $L^{R11}$ in general formula (R1-1) include a straight alkylene group, a branched alkylene group, a cycloalkylene group having 3 to 10 carbon atoms, an arylene group having 6 to 10 carbon atoms, a hydrocarbon group containing a combination of any of these groups, and a hydrocarbon group containing a combination of any of these groups with some of carbon atoms being substituted with non-carbon atoms.

Examples of the non-carbon atoms that substitute the carbon atoms of the hydrocarbon group include an oxygen atom, a sulfur atom, and a nitrogen atom. The hydrocarbon group with some of carbon atoms being substituted with non-carbon atoms may be, for example, a hydrocarbon group in which "—$CH_2$—" is substituted with "—O—", "—S—", or "—NH—" or a hydrocarbon group in which "—CH<" is substituted with "—N<". The carbon atoms to be substituted by the non-carbon atoms are carbon atoms other than the carbon atom to which the polar group represented by $F^{R11}$ is directly bonded. The number of carbon atoms substituted with the non-carbon atoms may be 1 or more than 1. For example, two or more carbon atoms may be substituted with atoms of the same element or with atoms of different elements.

When the divalent organic linking group represented by $L^{R11}$ is the hydrocarbon group described above, the total number of carbon atoms in the hydrocarbon group is, for example, 1 or more and 20 or less, 1 or more and 10 or less, or 1 or more and 6 or less. When the divalent organic linking group represented by $L^{R11}$ is a hydrocarbon group having some of carbon atoms being substituted with non-carbon atoms, the number of carbon atoms is at least 1, and the total number of carbon atoms and the non-carbon atoms substituting the carbon atoms may be 2 or more and 20 or less, 2 or more and 10 or less, or 2 or more and 6 or less.

Examples of $L^{R11}$ include hydrocarbon groups in which no carbon atoms are substituted with non-carbon atoms. Among these, straight or branched alkylene groups having 1 to 10 carbon atoms are preferable and straight alkylene groups having 1 to 6 carbon atoms are more preferable.

Specific examples of the divalent organic linking group represented by $L^{R12}$ in general formula (R1-2) include divalent organic linking groups having 2 or more carbon atoms selected from among the above-described specific examples of the divalent organic linking group represented by $L^{R11}$ in general formula (R1-1).

Examples of $L^{R12}$ include hydrocarbon groups having 2 or more carbon atoms in which no carbon atoms are substituted with non-carbon atoms. Among these, straight or branched alkylene groups having 2 to 20 carbon atoms are preferable, straight alkylene groups having 2 to 10 carbon atoms are more preferable, and straight alkylene groups having 2 to 6 carbon atoms are yet more preferable.

Specific examples of the divalent organic linking group represented by $L^{R13}$ in general formula (R1-3) include divalent organic linking groups having 3 or more carbon atoms selected from among the above-described specific examples of the divalent organic linking groups represented by $L^{R11}$ in general formula (R1-1).

Examples of $L^{R13}$ include hydrocarbon groups having 3 or more carbon atoms in which no carbon atoms are substituted with non-carbon atoms. Among these, straight or branched alkylene groups having 3 to 20 carbon atoms are preferable, straight alkylene group having 3 to 10 carbon atoms are more preferable, and straight alkylene groups having 3 to 6 carbon atoms are yet more preferable.

Examples of the group represented by general formula (R1-1) include groups in which the polar group represented by $F^{R11}$ is a carboxy group and the organic linking group represented by $L^{R11}$ is a straight alkylene group having 1 to 6 carbon atoms.

Examples of the group represented by general formula (R1-2) include groups in which the polar group represented by $F^{R12}$ and the polar group represented by $F^{R13}$ are both a carboxy group and the organic linking group represented by $L^{R12}$ is a straight alkylene group having 2 to 6 carbon atoms.

Examples of the group represented by general formula (R1-3) include groups in which the polar group represented by $F^{R14}$ the polar group represented by $F^{R15}$, and the polar group represented by $F^{R16}$ are all a carboxy group and the organic linking group represented by $L^{R13}$ is a straight alkylene group having 3 to 6 carbon atoms.

Specific examples (example organic groups of $R^1$) of the group represented by general formula (R1-1), the group represented by general formula (R1-2), and the group represented by general formula (R1-3) are described below.

These examples are not limiting. In the description of the specific examples (example organic groups of $R^1$) below, "*" indicates the position at which the group is bonded to $A^1$ in general formula (1).

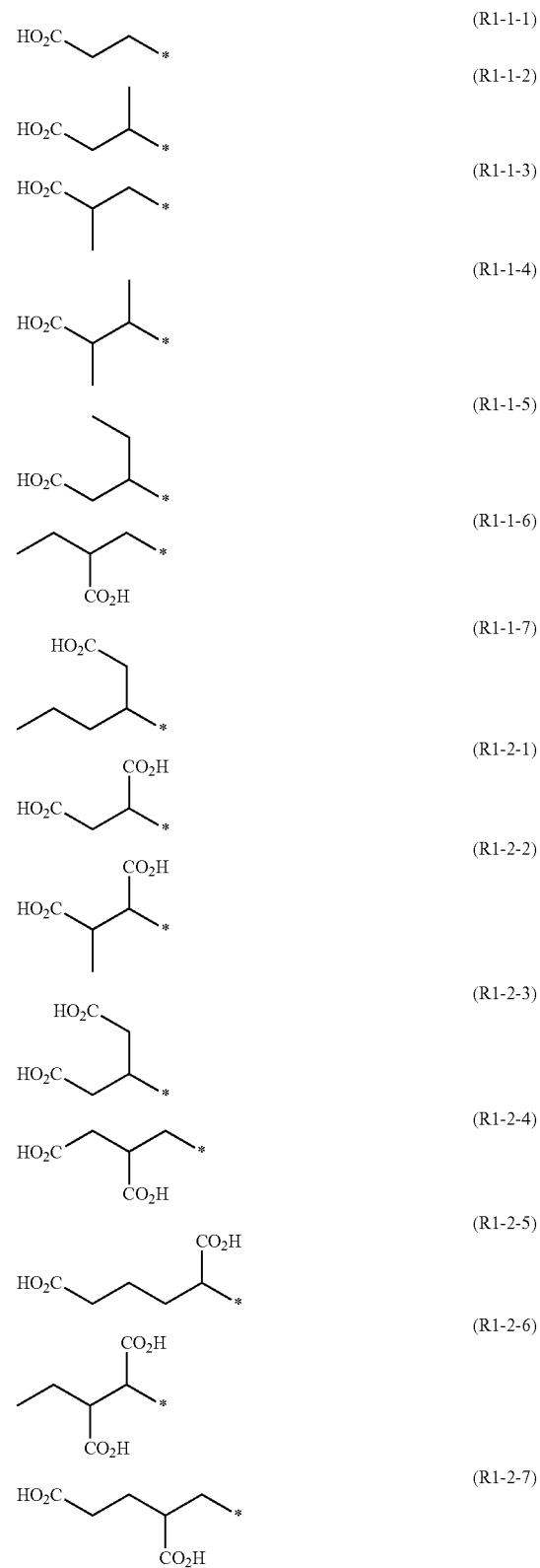

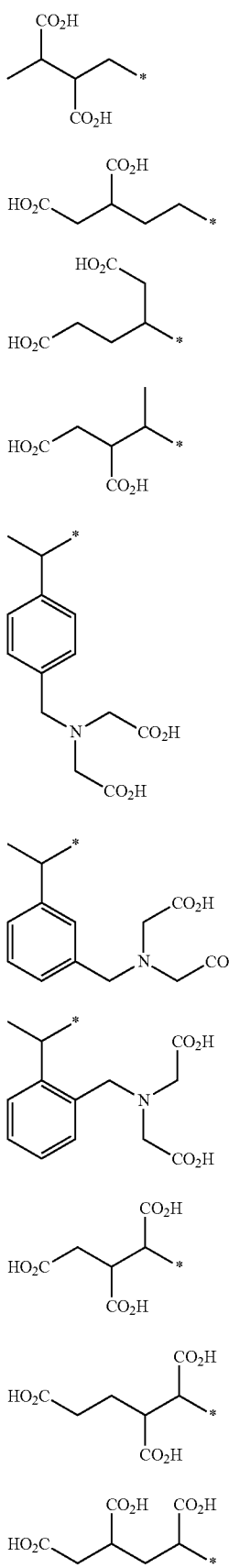

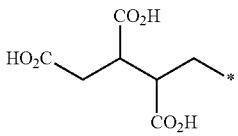

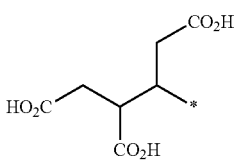

In general formula (1), $A^1$ and $A^2$ each independently represent an oxygen atom or a sulfur atom.

In general formula (1), m $A^1$ atoms and n $A^2$ atoms may be the same atoms or may contain different atoms. From the viewpoint of ease of synthesis, all of m $A^1$ atoms and n $A^2$ atoms may be the same atoms. From the viewpoints of availability of the raw material and ease of synthesis, all of m $A^1$ and n $A^2$ atoms may be sulfur atoms.

Examples of the divalent organic linking group represented by $L^1$ in general formula (1) and the divalent organic linking group represented by $L^2$ in general formula (1) include a straight alkylene group, a branched alkylene group, a cycloalkylene group having 3 to 10 carbon atoms, an arylene group having 6 to 10 carbon atoms, a hydrocarbon group containing a combination of any of these groups, and a hydrocarbon groups containing a combination of any of these groups with some of carbon atoms being substituted with non-carbon atoms.

Examples of the non-carbon atoms substituting the carbon atoms of the hydrocarbon group include an oxygen atom, a sulfur atom, and a nitrogen atom. The hydrocarbon group in which some of carbon atoms are substituted with non-carbon atoms may be a hydrocarbon group in which "—$CH_2$—" is substituted with "—O—", "—S—", or "—NH—" or in which "—CH<" is substituted with "—N<". The organic linking group represented by $L^1$ and the organic linking group represented by $L^2$ each have at least one carbon atom. The number of carbon atoms substituted with non-carbon atoms may be 1 or more than 1, and two or more carbon atoms may be substituted with atoms of the same element or different elements.

When the divalent organic linking group represented by $L^1$ is the hydrocarbon group described above, the total number of carbon atoms in the hydrocarbon group is, for example, 1 or more and 20 or less, 1 or more and 10 or less, or 1 or more and 6 or less.

When the divalent organic linking group represented by $L^1$ is a hydrocarbon group in which some of carbon atoms are substituted with non-carbon atoms, the number of carbon atoms is at least one and the total number of carbon atoms and the non-carbon atoms substituting the carbon atoms may be 2 or more and 20, 2 or more and 10 or less, or 2 or more and 6 or less.

The total number of carbon atoms and non-carbon atoms substituting the carbon atoms in the divalent organic linking group represented by $L^2$ is the same as that for $L^1$ described above.

Examples of $L^1$ include a hydrocarbon group in which no carbon atoms are substituted with non-carbon atoms and a hydrocarbon group in which "—$CH_2$—" is substituted with "—NH—". $L^1$ may be a straight or branched alkylene group having 1 to 20 carbon atoms or a straight or branched alkylene groups having 1 to 20 carbon atoms in which "—$CH_2$—" directly bonded to the carbonyl group in general formula (1) among the carbon atoms in the alkylene group is substituted with "—O—" or "—NH—". A straight alkylene group having 1 to 10 carbon atoms is more preferable.

Examples of $L^2$ include a hydrocarbon group in which no carbon atoms are substituted with non-carbon atoms and a hydrocarbon group in which "—$CH_2$—" is substituted with "—NH—". $L^2$ may be a straight or branched alkylene group having 1 to 20 carbon atoms or a straight or branched alkylene group having 1 to 20 atoms in which "—$CH_2$—" directly bonded to the carbonyl group in general formula (1) among carbon atoms in the alkylene group is substituted with "—O—" or "—NH—". A straight alkylene group having 1 to 10 carbon atoms is more preferable.

In general formula (1), m $L^1$ and n $L^2$ groups may be the same groups or may contain different groups. From the viewpoint of ease of synthesis, m $L^1$ and n $L^2$ groups may be the same groups.

In general formula (1), m indicates the average of the number of the "$R^1$-$A^1$-$L^1$-CO—" groups bonded to one m+n-valent organic linking group represented by X. In the case of an equal mixture of molecules in which two "$R^1$-$A^1$-$L^1$-CO—" groups are bonded to one organic linking group represented by X and molecules in which three "$R^1$-$A^1$-$L^1$-CO—" groups are bonded to one organic linking group represented by X, m is 2.5. While m may be an integer or a decimal number, m may be a number 1 or more and 9 or less, 2 or more and 7 or less, or 3 or more and 5 or less.

In general formula (1), n indicates the average of the number of "$P^1$-$A^2$-$L^2$-CO—" groups bonded to one m+n-valent organic linking group represented by X. As with m, n may be an integer or a decimal number, but n may be a number of 1 or more and 9 or less, 2 or more and 7 or less, or 3 or more and 6 or less.

The sum, m+n, is an integer of 2 or more and 10 or less or may be an integer of 5 or more and 9 or less or an integer of 6 or more and 8 or less.

The organic linking group represented by X in general formula (1) is an (m+n)-valent organic linking group having an alkyleneoxy group. The alkyleneoxy group is a group formed of an alkylene group and an ether bond (—O—) directly bonded to the alkylene group.

The organic linking group represented by X is to have at least the alkyleneoxy group and may further contain a group (for example, an arylene group) in addition to the alkylene group and the ether bond. However, the organic linking group represented by X is preferably a group constituted by an alkylene group and an ether bond only.

The organic linking group represented by X may contain two or more alkylene groups and/or two or more ether bonds. In other words, two or more alkylene groups may be bonded to one another through ether bonds, or two or more ether bonds may be bonded to two or more carbon atoms in one alkylene group. Alternatively, one ether bond may be bonded two or more carbon atoms in one alkylene group so as to form a ring.

Examples of the alkylene group include straight alkylene groups, branched alkylene groups, and cyclic alkylene groups (that is, cycloalkylene groups).

The organic linking group represented by X may contain at least a branched alkylene group, specifically, a branched alkylene group having a quaternary carbon atom, more specifically a branched alkylene group having a neopentyl structure. In the organic linking group represented by X, at least some of ether bonds may directly bond to the carbonyl group in general formula (1). More preferably, all of the atoms directly bonded to the carbonyl group in general formula (1) are the oxygen atoms of the ether bonds.

The total number of carbon atoms of the organic linking group represented by X is, for example, 1 or more and 20 or less, and may be 1 or more and 10 or less or 5 or more and 10 or less.

The total number of ether bonds in the organic linking group represented by X (the sum of the number of ether bonds directly bonded to the carbonyl group in general formula (1) and the number of other ether bonds) may be 1 to 20, 1 to 10, or 3 to 7.

Specific examples (example linking groups of X) of the organic linking group represented by X are described below. These examples are not limiting. In the specific examples (example linking groups of X) described below, "*" indicates the position at which the group is bonded to the carbonyl group of general formula (1).

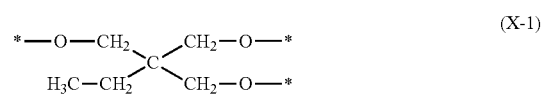

(X-1)

(X-2)

(X-3)

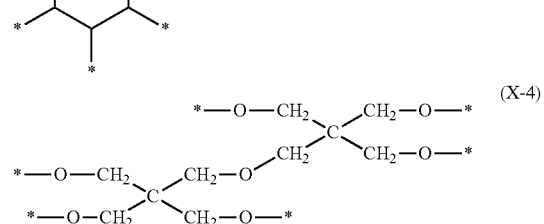

(X-4)

The polymer chain represented by $P^1$ in general formula (1) contains at least a unit represented by general formula (2)

General formula (2)

In general formula (2), $R^2$ and $R^3$ each independently represent a hydrogen atom or a methyl group, $L^3$ represents a carbonyloxy group, an oxycarbonyl group, a carbonyl group, an ether bond, or a phenylene group, and $R^4$ represents a monovalent organic group that has at least one selected from a carboxy group and a salt thereof, a polyoxyalkylene group, an amino group, a sulfo group and a salt thereof, and derivatives of the foregoing.

The amino group contained in the organic group represented by $R^4$ in general formula (2) is a monovalent functional group obtained by removing hydrogen from ammonia, a primary amine, or a secondary amine.

Examples of the salt of the carboxy group contained in the organic group represented by $R^4$ in general formula (2) include carboxylates such as sodium carboxylate, potassium carboxylate, and lithium carboxylate. Examples of the derivatives of a carboxy group (COOH) or a salt thereof contained in the organic group represented by $R^4$ in general formula (2) include carboxylate esters such as methyl carboxylate and ethyl carboxylate.

Examples of the derivatives of the polyoxyalkylene group and the amino group contained in the organic group represented by $R^4$ in general formula (2) include polyoxyalkylene groups and amino groups in which at least one hydrogen atom is substituted with a halogen atom.

Examples of the salt of the sulfo group contained in the organic group represented by $R^4$ in general formula (2) include sulfonate salts such as sodium sulfonate, potassium sulfonate, lithium sulfonate, and ammonium sulfonate. Examples of the derivatives of the sulfo group or a salt thereof contained in the organic group represented by $R^4$ in general formula (2) include sulfonate esters such as methyl sulfonate and ethyl sulfonate.

The polymer chain represented by $P^1$ in general formula (1) may contain one unit represented by general formula (2) or two or more different units represented by general formula (2). When the polymer chain represented by $P^1$ in general formula (1) contains two or more different units represented by general formula (2), such units may be units represented by general formula (2) that contain different adhesive functional units. When the polymer chain represented by $P^1$ in general formula (1) contains two or more different units represented by general formula (2), $R^2$, $R^3$, and $L^3$ in the units represented by general formula (2) may be the same from the viewpoint of ease of synthesis.

Examples of the unit represented by general formula (2) include those units which are formed by polymerizing (radically polymerizing, for example, monomers represented by general formula (2-1) below:

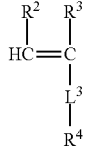

General formula (2-1)

In general formula (2-1), $R^2$, $P^3$, $R^4$, and $L^3$ are the same as $R^2$, $R^3$, $R^4$, and $L^3$ in general formula (2), respectively.

Examples of the monomers represented by general formula (2-1) include acrylate esters, methacrylate esters, crotonate esters, vinyl esters, vinyl ethers, vinyl ketones, styrenes, acrylamides, and methacrylamides.

When the monomer represented by general formula (2-1) is an acrylate ester, $R^2$ and $R^3$ each represent a hydrogen atom, $L^3$ represents a carbonyloxy group, and $R^4$ represents a monovalent organic group having at least one selected from a carboxy group, a polyoxyalkylene group, an amino group, a sulfo group and a salt thereof, and derivatives of the foregoing.

When the monomer represented by general formula (2-1) is a methacrylate ester, the definitions of the symbols are the same as those for the acrylate ester except that $R^2$ represents a methyl group.

When the monomer represented by general formula (2-1) is a crotonate ester, the definitions of the symbols are the same as those for the acrylate ester except that $R^2$ represents a methyl group.

When the monomer represented by general formula (2-1) is a vinyl ester, the definitions of the symbols are the same as those for the acrylate ester except that $L^3$ represents an oxycarbonyl group.

When the monomer represented by general formula (2-1) is a vinyl ether, the definitions of the symbols are the same as those for the acrylate ester except that $L^3$ represents an ether bond.

When the monomer represented by general formula (2-1) is a vinyl ketone, the definitions of the symbols are the same as those for the acrylate ester except that $L^3$ represents a carbonyl group.

When the monomer represented by general formula (2-1) is a styrene, the definitions of the symbols are the same as those for the acrylate ester except that $L^3$ represents a phenylene group.

When the monomer represented by general formula (2-1) is an acrylate ester, a methacrylate ester, a crotonate ester, a vinyl ester, a vinyl ether, a vinyl ketone, or a styrene, the monovalent organic group represented by $R^4$ is as follows.

Examples of the monovalent organic group represented by $R^4$ include organic groups that contain, as an adhesive functional group, a carboxy group or a salt thereof. Examples of such organic groups include groups represented by general formulae (R4-1) and (R4-2) below and salts thereof.

$$\text{*-}L^{R41}\text{-COOH} \qquad \text{General formula (R4-1)}$$

$$\text{*}L^{R42}\text{-OCO-}L^{R43}\text{-COOH} \qquad \text{General formula (R4-2)}$$

In general formula (R4-1) and (R4-2), $L^{R41}$, $L^{R42}$, and $L^{R43}$ each independently represent a divalent organic linking group and * indicates the position at which the group is bonded to $L^3$ in general formula (2-1).

Examples of the divalent organic linking group represented by $L^{R41}$, $L^{R42}$, or $L^{R43}$ in general formula (R4-1) and general formula (R4-2) include a straight alkylene group, a branched alkylene group, a cycloalkylene group having 3 to 20 carbon atoms, an arylene group having 6 to 20 carbon atoms, a hydrocarbon group containing a combination of any of these groups, and a hydrocarbon groups containing a combination of any of these groups with some of carbon atoms being substituted with non-carbon atoms.

Examples of the non-carbon atoms substituting the carbon atoms of the hydrocarbon group include an oxygen atom, a sulfur atom, and a nitrogen atom. The hydrocarbon group containing some of carbon atoms substituted with non-carbon atoms may be, for example, a hydrocarbon group in which "—$CH_2$—" is substituted with "—O—", "—S—", or "—NH—" or a hydrocarbon group in which "—CH<" is substituted with "—N<". The carbon atoms to be substituted with the non-carbon atoms are carbon atoms other than the carbon atoms to which $L^3$ in general formula (2-1) is directly bonded. The number of carbon atoms substituted with the non-carbon atoms may be 1 or more than 1. For example, two or more carbon atoms may be substituted with atoms of the same element or with atoms of different elements.

In general formula (R4-2), $L^{R42}$ and $L^{R43}$ may represent the same group or different groups.

When the divalent organic linking group represented by $L^{R41}$, $L^{R42}$, or $L^{R43}$ is the hydrocarbon group described above, the total number of carbon atoms in the hydrocarbon group is, for example, 1 or more and 20 or less, and may be 1 or more and 15 or less or 1 or more and 10 or less. When the divalent organic linking group represented by $L^{R41}$, $L^{R42}$, or $L^{R43}$ is the hydrocarbon group described above with some of carbon atoms being substituted with non-carbon atoms, the number of carbon atoms is at least 1 and the total number of carbon atoms and non-carbon atoms substituting the carbon atoms may be 2 or more and 20 or less, 2 or more and 15 or less, or 2 or more and 10 or less.

Examples of $L^{R41}$ include hydrocarbon groups in which no carbon atoms are substituted with non-carbon atoms. Among these, a straight or branched alkylene group having 1 to 20 carbon atoms, a phenylene group, or a hydrocarbon group having 7 to 15 carbon atoms in which an alkylene group is combined with a phenylene group is preferable, and a straight alkylene group having 1 to 10 carbon atoms is more preferable.

Examples of $L^{R42}$ include hydrocarbon groups in which no carbon atoms are substituted with non-carbon atoms. Among these, a straight or branched alkylene group having 1 to 20 carbon atoms is more preferable, a straight alkylene group having 1 to 10 carbon atoms is yet more preferable, and a straight alkylene groups having 1 to 6 carbon atoms is particularly preferable.

Examples of $L^{R43}$ include hydrocarbon groups in which no carbon atoms are substituted with non-carbon atoms. Among these, a straight or branched alkylene group having 1 to 20 carbon atoms, a phenylene group, or a hydrocarbon group having 7 to 10 carbon atoms in which a phenylene group is combined with an alkylene group is more preferable, a straight alkylene group having 1 to 10 carbon atoms or a phenylene group is more preferable, and a straight alkylene group having 1 to 6 carbon atoms or an o-phenylene group is particularly preferable.

An example of the monovalent organic group represented by $R^4$ having, as an adhesive functional group, a "salt of a carboxy group" is any of the "organic groups having a carboxy group as the adhesive functional group" with some of hydrogen atoms being substituted with a sodium atom, a potassium atom, or a lithium atom. Of these, a preferable example of the monovalent organic group represented by $R^4$ having, as an adhesive functional group, a "salt of a carboxy group" is any of the "organic groups having a carboxy group as the adhesive functional group" with some of hydrogen atoms being substituted with a sodium atom (sodium carboxylate).

Of the monovalent organic groups represented by $R^4$, examples of the organic group having a carboxy group or a salt thereof include groups represented by general formula (R4-2). Among these, organic groups in which $L^{R42}$ represents a straight alkylene group having 1 to 20 carbon atoms and $L^{R43}$ represents a straight alkylene group having 1 to 10 carbon atoms or an o-phenylene group are more preferable, organic groups in which $L^{R42}$ represents a straight alkylene group having 1 to 10 carbon atoms and $L^{R43}$ represents a straight alkylene group having 1 to 6 carbon atoms or an o-phenylene group are yet more preferable, and organic groups in which $L^{R42}$ represents a straight alkylene group having 1 to 6 carbon atoms and $L^{R43}$ represents a straight alkylene group having 1 to 6 carbon atoms or an o-phenylene group are particularly preferable.

Among the monovalent organic groups represented by $R^4$, an example of the organic group that contains "a derivative of a carboxy group or a salt thereof" as an adhesive functional group is the above-described "organic group having a carboxy group as an adhesive functional group" in which a hydrogen atom is substituted with an alkyl group (for example, a methyl group or an ethyl group) (alkyl carboxylate ester).

Examples of the monovalent organic group represented by $R^4$ containing a polyoxyalkylene group as the adhesive functional group include groups represented by general formula (R4-3) below.

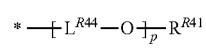

General formula (R4-3)

In general formula (R4-3), $L^{R44}$ represents a straight or branched alkylene group having 1 to 20 carbon atoms, $R^{R41}$ represents a straight or branched alkyl group having 1 to 10 carbon atoms, p represents an integer of 1 or more and 50 or less, and * indicates the position at which the group is bonded to $L^3$ in general formula (2-1).

Examples of $L^{R44}$ include straight alkylene groups having 1 to 20 carbon atoms. Of these, straight alkylene groups having 10 or less carbon atoms are preferable and straight alkylene groups having 1 to 6 carbon atoms are more preferable.

Examples of $R^{R41}$ include straight alkyl groups having 1 to 20 carbon atoms. Of these, straight alkyl groups having 10 or less carbon atoms are more preferable and straight alkyl groups having 1 to 6 carbon atoms are yet more preferable.

For example, p is in the range of 1 to 30, preferably 1 to 20, more preferably 5 to 20, and yet more preferably 5 to 15.

The group represented by general formula (R4-3) may be an organic group in which $L^{R44}$ represents a straight alkylene group having 1 to 20 carbon atoms, $R^{P41}$ represents a straight alkyl group having 1 to 10 carbon atoms, and p represents an integer of 5 or more and 20 or less, or may be an organic group in which $L^{R44}$ represents a straight alkylene group having 1 to 10 carbon atoms, $R^{R41}$ represents a straight alkyl group having 1 to 6 carbon atoms, and p represents an integer of 5 or more and 15 or less.

An example of the monovalent organic group represented by $R^4$ that contains a "derivative of a polyoxyalkylene group" as the adhesive functional group is the above-described "organic group having a polyoxyalkylene group as the adhesive functional group" in which at least one hydrogen atom is substituted with a halogen atom.

Examples of the halogen atom include a fluorine atom, a chlorine atom, a bromine atom, and an iodine atom. The number of hydrogen atoms substituted with halogen atoms may be 1 or more than 1. All hydrogen atoms of the polyoxyalkylene group may be substituted with halogen atoms.

Examples of the monovalent organic group represented by $R^4$ that contains an amino group as the adhesive functional group include groups represented by general formula (R4-4) below:

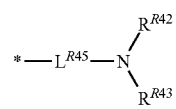

General formula (R4-4)

In general formula (R4-4), $L^{R45}$ represents a single bond or a divalent organic linking group, $R^{R42}$ and $R^{R43}$ each independently represent a hydrogen atom or a straight or branched alkyl group having 1 to 20 carbon atoms, and * indicates the position at which the group is bonded to $L^3$ in general formula (2-1).

Examples of the divalent organic linking group represented by $L^{R45}$ in general formula (R4-4) include a straight alkylene group, a branched alkylene group, a cycloalkylene group having 3 to 20 carbon atoms, an arylene group having 6 to 20 carbon atoms, a hydrocarbon group containing a combination of any of these groups, and a hydrocarbon group containing a combination of any of these groups with some of carbon atoms being substituted with non-carbon atoms.

Examples of the non-carbon atoms that substitute the carbon atoms of the hydrocarbon group include an oxygen atom, a sulfur atom, and a nitrogen atom. The hydrocarbon group in which some of carbon atoms are substituted with non-carbon atoms may be, for example, a hydrocarbon group in which "—$CH_2$—" is substituted with "—O—", "—S—", or "—NH—" or a hydrocarbon group in which "—CH<" is substituted with "—N<". The carbon atoms to be substituted by the non-carbon atoms are carbon atoms other than the carbon atoms to which $L^3$ in general formula (2-1) is directly bonded. The number of carbon atoms substituted with the non-carbon atoms may be 1 or more than 1. For example, two or more carbon atoms may be substituted with atoms of the same element or with atoms of different elements.

When the divalent organic linking group represented by $L^{R45}$ is the above-described hydrocarbon group, the total number of carbon atoms in the hydrocarbon group is, for example 1 or more and 20 or less, may be 1 or more and 15 or less, or may be 1 or more and 10 or less. When the divalent organic linking group represented by $L^{R45}$ is the above-described hydrocarbon group in which some of carbon atoms are substituted with non-carbon atoms, the number of carbon atoms is at least 1 and the total number of carbon atoms and the non-carbon atoms substituting the carbon atoms may be 2 or more and 20 or less, 2 or more and 15 or less, or 2 or more and 10 or less.

Examples of $L^{R45}$ include a single bond and hydrocarbon groups in which no carbon atoms are substituted with non-carbon atoms. Among these, a single bond and a straight or branched alkylene group having 1 to 15 carbon atoms are preferable, a single bond and a straight alkylene group having 1 to 10 carbon atoms are more preferable, and a single bond and a straight alkylene group having 1 to 6 carbon atoms are particularly preferable.

In general formula (R4-4), $R^{R42}$ and $R^{R43}$ may represent the same group or different groups.

Examples of $R^{R42}$ and $R^{R43}$ include, independently, a hydrogen atom and straight or branched alkyl groups having 1 to 20 carbon atoms. Straight alkyl groups having 1 to 10 carbon atoms are more preferable and straight alkyl groups having 1 to 6 carbon atoms are yet more preferable.

The group represented by general formula (R4-4) may be an organic group in which $L^{R45}$ represents a single bond or a straight alkylene group having 1 to 20 carbon atoms and $R^{R42}$ and $R^{R43}$ both represent a straight alkyl group having 1 to 10 carbon atoms, or may be an organic group in which $L^{R45}$ represents a single bond or a straight alkylene groups having 1 to 10 carbon atoms and $R^{R42}$ and $R^{R43}$ both represent a straight alkyl group having 1 to 6 carbon atoms.

Examples of the monovalent organic group represented by $R^4$ that has a "derivative of an amino group" as the adhesive functional group include the above-described examples of the "organic group having an amino group as the adhesive functional group" but with at least one hydrogen atom being substituted with a halogen atom.

Examples of the halogen atom include a fluorine atom, a chlorine atom, a bromine atom, and an iodine atom. The number of hydrogen atoms substituted with halogen atoms may be 1 or more than 1. When the amino group contains at least one selected from an alkyl group and an alkylene group, hydrogen atoms in the at least one selected from an alkyl group and an alkylene group may be substituted with halogen atoms and a hydrogen atom directly bonded to the nitrogen atom of the amino group may be substituted with a halogen atom.

Examples of the monovalent organic group represented by $R^4$ that has a sulfo group or a salt thereof as the adhesive functional group include groups represented by general formulae (R4-5) and (R4-6) below.

$$\text{*-}L^{R46}\text{-}SO_3H \qquad \qquad \text{General formula (R4-5)}$$

$$\text{*}L^{R47}\text{-}SO_3M \qquad \qquad \text{General formula (R4-6)}$$

In general formula (R4-5) and general formula (R4-6), $L^{R46}$ and $L^{R47}$ each independently represent a single bond or a divalent organic linking group, M represents Na, K, Li, or $NH_4$, and * indicates the position at which the group is bonded to $L^3$ in general formula (2-1).

Examples of the divalent organic linking group represented by $L^{R46}$ or $L^{R47}$ in general formula (R4-5) and general formula (R4-6) include a straight alkylene group, a branched alkylene group, a cycloalkylene group having 3 to 20 carbon atoms, an arylene group having 6 to 20 carbon atoms, a hydrocarbon group containing a combination of any of these groups, and a hydrocarbon group containing a combination of any of these groups with some of carbon atoms being substituted with non-carbon atoms.

Examples of the non-carbon atoms that substitute the carbon atoms of the hydrocarbon group include an oxygen atom, a sulfur atom, and a nitrogen atom. The hydrocarbon group with some of carbon atoms being substituted with non-carbon atoms may be, for example, a hydrocarbon group in which "—$CH_2$—" is substituted with "—O—", "—S—", or "—NH—" or a hydrocarbon group in which "—CH<" is substituted with "—N<". The carbon atoms to be substituted by the non-carbon atoms are carbon atoms other than the carbon atoms to which $L^3$ in general formula (2-1) is directly bonded. The number of carbon atoms substituted with the non-carbon atoms may be 1 or more than 1. For example, two or more carbon atoms may be substituted with atoms of the same element or with atoms of different elements.

When the divalent organic linking group represented by $L^{R46}$ or $L^{R47}$ is the above-described hydrocarbon group, the total number of carbon atoms in the hydrocarbon group is, for example, 1 or more and 20 or less, may be 1 or more and 15 or less, or may be 1 or more and 10 or less. When the divalent organic linking group represented by $L^{R46}$ or $L^{R47}$ is the above-described hydrocarbon group in which some of carbon atoms are substituted with non-carbon atoms, the number of carbon atoms is at least 1 and the total number of carbon atoms and the non-carbon atoms substituting the carbon atoms may be 2 or more and 20 or less, 2 or more and 15 or less, or 2 or more and 10 or less.

Examples of $L^{R46}$ and $L^{R47}$ include a single bond and hydrocarbon groups in which no carbon atoms are substituted with non-carbon atoms. Among these, a single bond and straight or branched alkylene groups having 1 to 20 carbon atoms are preferable, and a single bond and straight alkylene groups having 1 to 10 carbon atoms are more preferable.

In general formula (R4-6), M preferably represents Na or $NH_4$.

Of the monovalent organic groups represented by $R^4$ that contains a sulfo group or a salt thereof, groups represented by general formula (R4-6) are preferable. Among these, organic groups in which $L^{R47}$ represents a single bond or a straight alkylene group having 1 to 10 carbon atoms and M represents Na or $NH_4$ are more preferable.

An example of the monovalent organic group represented by $R^4$ that has a "derivative of a sulfo group or a salt thereof" as the adhesive functional group is the above-described "organic group having a sulfo group as the adhesive functional group" in which a hydrogen atom is substituted with an alkyl group (such as a methyl group or an ethyl group) (alkyl sulfonate ester).

When the monomer represented by general formula (2-1) is an acrylamide, $R^2$ and $R^3$ each represent a hydrogen atom, $L^3$ represents a carbonyl group, and $R^4$ represents an amino group.

When the monomer represented by general formula (2-1) is a methacrylamide, the definitions of the symbols are the same as those for the acrylamide except that $R^3$ represents a methyl group.

Examples of the amino group represented by $R^4$ include groups represented by general formula (R4-4) with $L^{R45}$ representing a single bond. Specific examples of $R^{42}$ and $R^{43}$ are the same as those described above.

From the viewpoint of affinity to the resin, the monomer represented by general formula (2-1) may be a monomer with $R^4$ representing a monovalent organic group containing at least one selected from a group represented by structural formula (R4) below, a carboxyalkyl group, a polyoxyalkylene group, a dialkylamino group, and a sulfo group and a salt thereof:

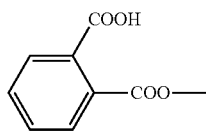

Structural formula (R4)

From the viewpoint of affinity to polyester resins, such as polyethylene terephthalate, among resins, the polymer chain represented by $P^1$ in general formula (1) may contain, as the unit represented by general formula (2), a unit with $R^4$ representing a monovalent organic group that contains at least one selected from a group represented by structural formula (R4), a polyoxyalkylene group, and an alkylamino group.

From the viewpoint of affinity to polyolefin resins, such as polypropylene, among resins, the polymer chain represented by $P^1$ in general formula (1) may contain a unit represented by general formula (2) with $R^4$ representing a monovalent organic group that contains at least one selected from a group represented by structural formula (R4), a carboxyalkyl group, a dialkylamino group, and a sulfo group and a salt thereof.

From the viewpoint of affinity to both polyester resins and polyolefin resins, the polymer chain represented by P in general formula (1) may contain both a unit represented by general formula (2) with $R^4$ representing a monovalent organic group that contains at least one selected from a group represented by structural formula (R4), a polyoxyalkylene group, and a dialkylamino group and a unit represented by general formula (2) with $R^4$ representing a monovalent organic group that contains at least one selected from a group represented by structural formula (R4), a carboxyalkyl group, a dialkylamino group, and a sulfo group and a salt thereof.

The fraction (content) of the unit represented by general formula (2) contained in the entire polymer chain represented by $P^1$ in general formula (1) is, for example, 5% by mass or more and 95% by mass or less and may be 5% by mass or more and 50% by mass or less. When two or more different units represented by general formula (2) are contained in the polymer chain represented by $P^1$, this content is the total content of the two or more different units represented by general formula (2).

The polymer chain represented by $P^1$ in general formula (1) may further contain a unit represented by general formula (3) in addition to the unit represented by general formula (2).

General formula (3)

In general formula (3), $R^5$ and $R^6$ each independently represent a hydrogen atom or a methyl group, $L^4$ represents a carbonyloxy group, an oxycarbonyl group, a carbonyl group, an ether bond, or a phenylene group, and $R^7$ represents an alkyl group having 3 to 20 carbon atoms.

When the polymer chain represented by $P^1$ further contains a unit represented by general formula (3) and the resulting dispersant is used in a liquid developer containing a carrier liquid containing a hydrocarbon solvent, the toner particles exhibit high dispersibility. The reason for this is not clear but is presumably that the organic group represented by $R^1$ having affinity to the toner particles and the alkyl group represented by $R^7$ having affinity to hydrocarbon solvents facilitate dispersing of the toner particles in the carrier liquid.

The polymer chain represented by $P^1$ in general formula (1) may contain only one unit represented by general formula (3) or two or more different units represented by general formula (3). From the viewpoint of ease of synthesis, when the polymer chain represented by $P^1$ in general formula (1) contains two or more different units represented by general formula (3), $R^5$, $R^6$, and $L^4$ in general formula (3) for the two or more units may be the same. From the viewpoint of ease of synthesis, $R^5$, $R^6$, and $L^4$ in general formula (3) may be the same as $P^2$, $R^3$, and $L^3$ in general formula (2) respectively.

Examples of the unit represented by general formula (3) are units formed by polymerization (for example, radical polymerization) of monomers represented by general formula (3-1) below:

General formula (3-1)

In general formula (3-1), $R^5$, $R^6$, $R^7$, and $L^4$ are respectively the same as $R^5$, $R^6$, $R^7$, and $L^4$ in general formula (3).

Examples of the monomers represented by general formula (3-1) include acrylate esters, methacrylate esters, crotonate esters, vinyl esters, vinyl ethers, vinyl ketones, styrenes, acrylamides, and methacrylamides.

When the monomer represented by general formula (3-1) is an acrylate ester, $R^5$ and $R^6$ each represent a hydrogen atom, $L^4$ represents a carbonyloxy group, and $R^7$ represents an alkyl group having 3 to 20 carbon atoms.

When the monomer represented by general formula (3-1) is a methacrylate ester, the definitions of the symbols are the same as those for the acrylate ester except that $R^6$ represents a methyl group.

When the monomer represented by general formula (3-1) is a crotonate ester, the definitions of the symbols are the same as those for the acrylate ester except that $R^5$ represents a methyl group.

When the monomer represented by general formula (3-1) is a vinyl ester, the definitions of the symbols are the same as those for the acrylate ester except that $L^4$ represents an oxycarbonyl group.

When the monomer represented by general formula (3-1) is a vinyl ether, the definitions of the symbols are the same as those for the acrylate ester except that $L^4$ represents an ether bond.

When the monomer represented by general formula (3-1) is a vinyl ketone, the definitions of the symbols are the same as those for the acrylate ester except that $L^4$ represents a carbonyl group.

When the monomer represented by general formula (3-1) is a styrene, the definitions of the symbols are the same as those for the acrylate ester except that $L^4$ represents a phenylene group.

The alkyl group having 3 to 20 carbon atoms represented by $R^7$ may be straight or branched but is preferably straight. A straight alkyl group having 5 to 15 carbon atoms is more preferable, a straight alkyl group having 5 to 12 carbon atoms is yet more preferable, and a straight alkyl group having 6 to 10 carbon atoms is still more preferable.

The fraction (content) of the unit represented by general formula (3) contained in the entire polymer chain represented by $P^1$ in general formula (1) is, for example, 5% by mass or more and 95% by mass or less and may be 50% by mass or more and 95% by mass or less. When the polymer chain represented by $P^1$ contains two or more different units represented by general formula (3), this content is the total content of the two or more different units represented by general formula (3).

The polymer chain represented by $P^1$ in general formula (1) may contain an additional unit in addition to the units represented by general formula (2) and general formula (3). This additional unit is not particularly limited and examples thereof include units represented by general formula (4) below:

General formula (4)

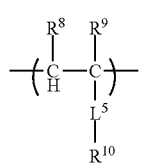

In general formula (4), $R^8$ and $R^9$ each independently represent a hydrogen atom or a methyl group, $L^5$ represents a carbonyloxy group, an oxycarbonyl group, a carbonyl group, an ether bond, or a phenylene group, and $R^{10}$ represents an alkyl group having 1 or 2 carbon atoms.

In general formula (4), $R^8$, $R^9$, and $L^5$ are respectively the same as $R^5$, $R^6$, and $L^4$ in general formula (3).

The polymer chain represented by $P^1$ in general formula (1) may contain one unit represented by general formula (4) or two or more different units represented by general formula (4). When the polymer chain represented by $P^1$ in general formula (1) contains two or more different units represented by general formula (4), $R^8$, $R^9$, and $L^5$ in general formula (4) in the two or more different units may be the same from the viewpoint of ease of synthesis. Also from the viewpoint of ease of synthesis, $R^8$, $R^9$, and $L^5$ in general formula (4) may be the same as $R^2$, $R^3$, and $L^3$ in general formula (2), respectively.

Examples of the unit represented by general formula (4) include units formed by polymerization (for example, radical polymerization) of monomers represented by general formula (4-1) below.

General formula (4-1)

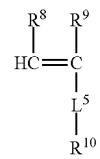

In general formula (4-1), $R^8$, $R^9$, $R^{10}$, and $L^5$ are respectively the same as $R^8$, $R^9$, $R^{10}$, and $L^5$ in general formula (4).

Examples of the monomers represented by general formula (4-1) include acrylate esters, methacrylate esters, crotonate esters, vinyl esters, vinyl ethers, vinyl ketones, styrenes, acrylamides, and methacrylamides.

When the monomer represented by general formula (4-1) is an acrylate ester, $R^8$ and $R^9$ each represent a hydrogen atom, $L^5$ represents a carbonyloxy group, and $R^{10}$ represents an alkyl group having 1 or 2 carbon atoms.

When the monomer represented by general formula (4-1) is a methacrylate ester, the definitions of the symbols are the same as those for the acrylate ester except that $R^9$ represents a methyl group.

When the monomer represented by general formula (4-1) is a crotonate ester, the definitions of the symbols are the same as those for the acrylate ester except that $R^8$ represents a methyl group.

When the monomer represented by general formula (4-1) is a vinyl ester, the definitions of the symbols are the same as those for the acrylate ester except that $L^5$ represents an oxycarbonyl group.

When the monomer represented by general formula (4-1) is a vinyl ether, the definitions of the symbols are the same as those for the acrylate ester except that $L^5$ represents an ether bond.

When the monomer represented by general formula (4-1) is a vinyl ketone, the definitions of the symbols are the same as those for the acrylate ester except that $L^5$ represents a carbonyl group.

When the monomer represented by general formula (4-1) is a styrene, the definitions of the symbols are the same as those for the acrylate ester except that $L^5$ represents a phenylene group.

When the polymer chain represented by $P^1$ in general formula (1) contains the additional unit, the fraction (content) of the additional unit contained in the entire polymer chain is, for example, 5% by mass or more and 95% by mass or less and may be 5% by mass or more and 50% by mass or less. When the polymer chain represented by $P^1$ contains two or more different additional units, the content is the total content of the two or more different additional units.

The polymer chain represented by $P^1$ in general formula (1) may be a polymer chain represented by general formula (5) below:

General formula (5)

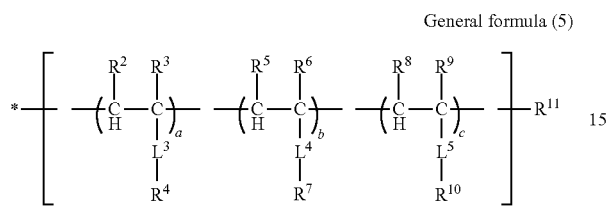

In general formula (5), $R^2$ to $R^{10}$ and $L^3$ to $L^5$ are respectively the same as $R^2$ to $R^{10}$ and $L^3$ to $L^5$ in general formula (2) to general formula (4). In general formula (5), * indicates the position at which the group is bonded to $A^2$ in general formula (1), $R^{11}$ represents a hydrogen atom, a hydroxy group, an alkyl group having 1 to 10 carbon atoms, or an alkoxy group having 1 to 10 carbon atoms, and a, b, and c each independently represent a content (% by mass) of the corresponding unit where $0<a\leq100$, $0\leq b\leq100$, $0\leq c<100$, $a+b+c=100$.

The polymer chain represented by general formula (5) may contain two or more different units represented by general formula (2). In that case, a in general formula (5) represents a total content (% by mass) of all the units represented by general formula (2). In particular, a may be 1 or more and 99 or less, 5 or more and 95 or less, 5 or more and 75, or 5 or more and 50 or less.

Similarly, the polymer chain represented by general formula (5) may contain two or more different units represented by general formula (3). In that case, b in general formula (5) represents a total content (% by mass) of all the units represented by general formula (3). In particular, b may be 1 or more and 99 or less, 5 or more and 95 or less, 50 or more and 95 or less, or 60 or more and 85 or less.

The polymer chain represented by general formula (5) may contain two or more different units represented by general formula (4). In that case, c in general formula (5) represents a total content (% by mass) of all the units represented by general formula (4). In particular, c may be 1 or more and 99 or less, 5 or more and 95 or less, 5 or more and 75 or less, or 5 or more and 50 or less.

When the polymer chain represented by general formula (5) is a copolymer, it may be a random copolymer or a block copolymer.

Examples of the polymer chain represented by general formula (5) include polymer chains represented by general formulae (5-1) to (5-10) below.

In general formula (5-1) to (5-6), $R^7$, $R^{10}$, a1, b1, and c1 are respectively the same as $R^7$, $R^{10}$, a, b, and c in general formula (5).

In general formula (5-7) to (5-10), $R^7$ and $R^{10}$ are respectively the same as $R^7$ and $R^{10}$ in general formula (5), a total of a1 and a2 is the same as a in general formula (5), and b1 and c1 are respectively the same as b and c in general formula (5).

In general formula (5-4), (5-7), and (5-8), n represents the ethyleneoxy group repeating number and n=9.

General formula (5-1)

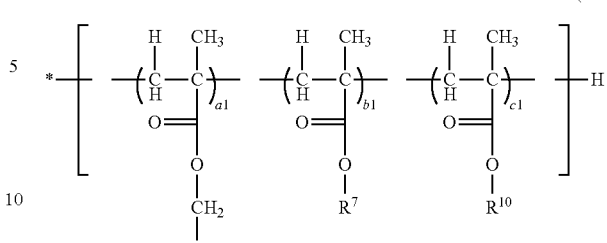

General formula (5-2)

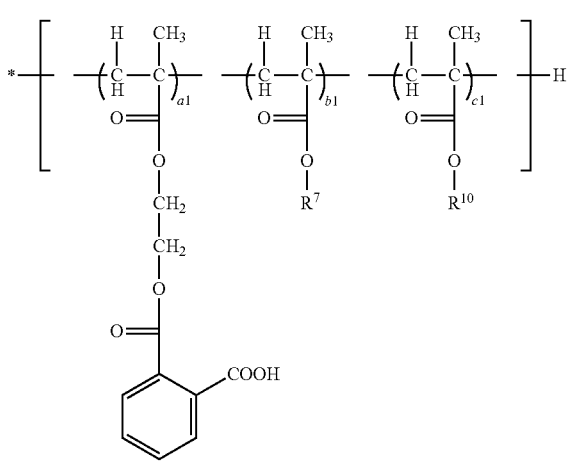

General formula (5-3)

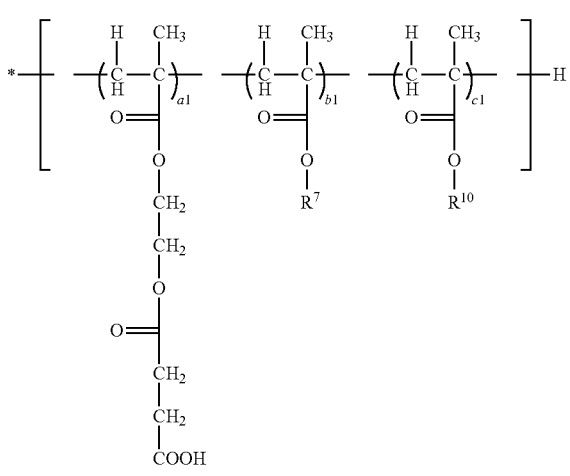

General formula (5-4)

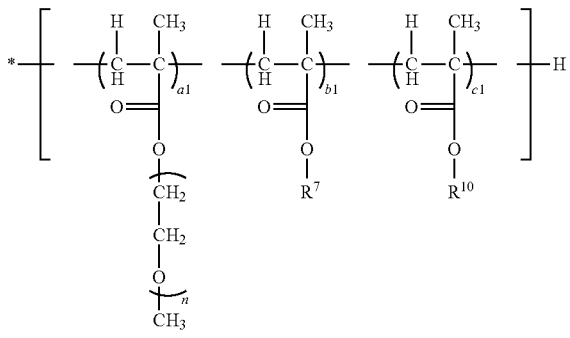

n = 9

General formula (5-5)

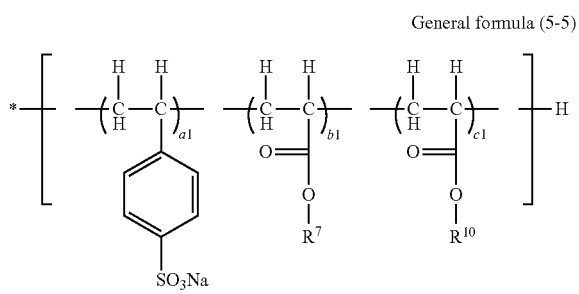

General formula (5-6)

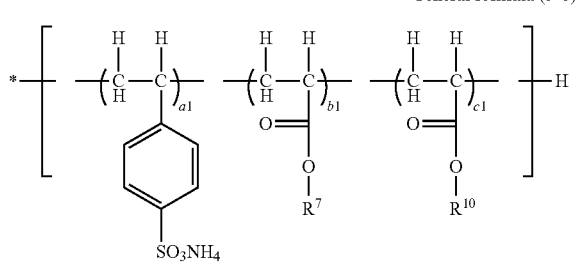

General formula (5-7)

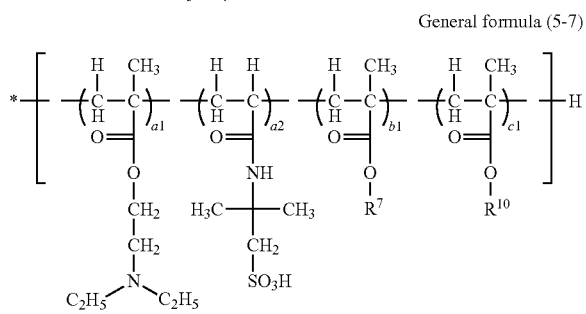

General formula (5-8)

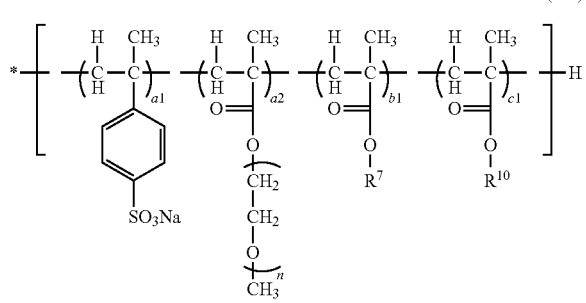

n = 9

General formula (5-9)

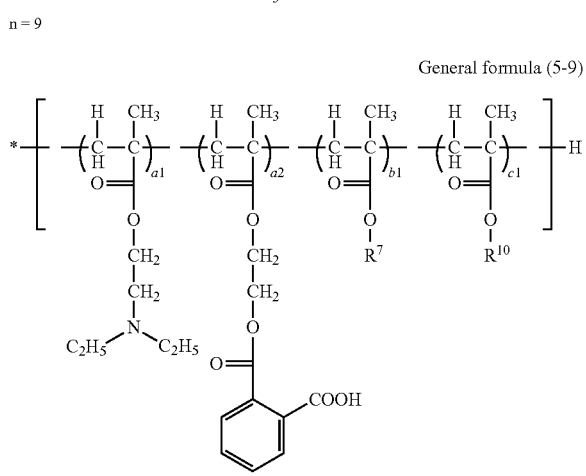

General formula (5-10)

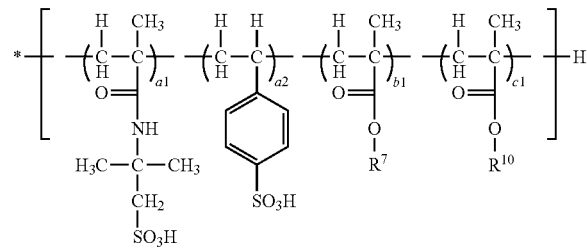

Specific examples of the polymer chain represented by general formula (5) ("Example Polymer Chain" in the table below) include, but are not limited to, those described in Table 1 below. Example Polymer Chains described below are all random copolymers. In the table below, $R^7$, $R^{10}$, a1, a2, b1, and c1 mean $R^7$, $R^{10}$, a1, a2, b1, and c1 in the corresponding general formula.

TABLE 1

| Example Polymer Chain | General formula | $R^7$ | $R^{10}$ | a1 | a2 | b1 | c1 |
|---|---|---|---|---|---|---|---|
| P1-1 | 5-1 | n-$C_6H_{13}$ | $CH_3$ | 10 | 0 | 85 | 5 |
| P1-2 | 5-2 | n-$C_6H_{13}$ | $CH_3$ | 10 | 0 | 85 | 5 |
| P1-3 | 5-3 | n-$C_6H_{13}$ | $CH_3$ | 10 | 0 | 85 | 5 |
| P1-4 | 5-4 | n-$C_6H_{13}$ | $CH_3$ | 10 | 0 | 85 | 5 |
| P1-5 | 5-5 | n-$C_6H_{13}$ | $CH_3$ | 10 | 0 | 85 | 5 |
| P1-6 | 5-6 | n-$C_6H_{13}$ | $CH_3$ | 10 | 0 | 85 | 5 |
| P1-7 | 5-7 | n-$C_6H_{13}$ | $CH_3$ | 10 | 10 | 70 | 10 |
| P1-8 | 5-8 | n-$C_6H_{13}$ | $CH_3$ | 20 | 20 | 55 | 5 |
| P1-9 | 5-9 | n-$C_6H_{13}$ | $CH_3$ | 10 | 10 | 75 | 5 |
| P1-10 | 5-10 | n-$C_6H_{13}$ | $CH_3$ | 20 | 20 | 55 | 5 |
| P1-11 | 5-1 | n-$C_6H_{13}$ | $CH_3$ | 20 | 0 | 40 | 20 |
| P1-12 | 5-1 | n-$C_6H_{13}$ | $CH_3$ | 20 | 0 | 70 | 10 |
| P1-13 | 5-1 | —$CH_2CH(C_2H_5)C_4H_9$ | $CH_3$ | 20 | 0 | 75 | 5 |
| P1-14 | 5-1 | —$CH_2CH(C_2H_5)C_4H_9$ | H | 20 | 0 | 75 | 5 |
| P1-15 | 5-2 | n-$C_6H_{13}$ | — | 50 | 0 | 50 | 0 |
| P1-16 | 5-2 | n-$C_6H_{13}$ | — | 20 | 0 | 80 | 0 |
| P1-17 | 5-2 | n-$C_6H_{13}$ | — | 30 | 0 | 70 | 0 |
| P1-18 | 5-4 | n-$C_6H_{13}$ | $CH_3$ | 20 | 0 | 60 | 20 |
| P1-19 | 5-4 | —$CH_2CH(C_2H_5)C_4H_9$ | $CH_3$ | 10 | 0 | 85 | 5 |
| P1-20 | 5-5 | n-$C_6H_{13}$ | $CH_3$ | 20 | 0 | 70 | 10 |
| P1-21 | 5-7 | n-$C_6H_{13}$ | $CH_3$ | 20 | 20 | 55 | 5 |
| P1-22 | 5-8 | n-$C_6H_{13}$ | $CH_3$ | 10 | 10 | 75 | 5 |
| P1-23 | 5-9 | n-$C_6H_{13}$ | $CH_3$ | 15 | 15 | 65 | 5 |
| P1-24 | 5-10 | n-$C_6H_{13}$ | $CH_3$ | 15 | 15 | 60 | 10 |
| P1-25 | 5-10 | n-$C_6H_{13}$ | $CH_3$ | 10 | 10 | 70 | 10 |

The weight-average molecular weight of the dispersant represented by general formula (1) is, for example 1,000 or more and 1,000,000 or less or about 1,000 or more and about 1,000,000 or less, and may be 3,000 or more and 200,000 or less, 5,000 or more and 100,000 or less, or 15,000 or more and 100,000 or less.

The weight-average molecular weight is measured by gel permeation chromatography (GPC). The molecular weight measurement by GPC is conducted by using HLC-8120 GPC, which is a gel permeation chromatograph (GPC) produced by Tosoh Corporation, as the measurement instrument with TSKgel Super HM-M (15 cm) columns produced by Tosoh Corporation and a THF solvent. The weight-average molecular weight is calculated from the measurement result by using molecular weight calibration curves obtained from monodisperse polystyrene standard samples.

Non-limiting specific examples of the dispersant represented by general formula (1) are described below.

In Tables 2 and 3 below, $R^1$, $A^1$, $L^1$, X, $L^2$, $A^2$, and $P^1$ respectively mean $R^1$, $A^1$, $L^1$, X, $L^2$, $A^2$, and $P^1$ in general formula (1). In the tables below, each number listed in the $R^1$ column is the number of "Example organic group of $R^1$" and each number listed in the X column is the number of "Example linking group of X" described above. Each number listed in the $P^1$ column is the number of the "Example Polymer Chain" described above.

TABLE 2

| Dispersant | $R^1$ | $A^1$ | $L^1$ | X | $L^2$ | $A^2$ | $P^1$ | Weight-average molecular weight |
|---|---|---|---|---|---|---|---|---|
| P1-1 | R1-2-4 | S | $C_2H_4$ | X-4 | $C_2H_4$ | S | P1-1 | 32,000 |
| P1-2 | R1-2-4 | S | $C_2H_4$ | X-4 | $C_2H_4$ | S | P1-2 | 67,400 |
| P1-3 | R1-2-4 | S | $C_2H_4$ | X-4 | $C_2H_4$ | S | P1-3 | 67,500 |
| P1-4 | R1-2-4 | S | $C_2H_4$ | X-4 | $C_2H_4$ | S | P1-4 | 51,900 |
| P1-5 | R1-2-4 | S | $C_2H_4$ | X-4 | $C_2H_4$ | S | P1-5 | 47,800 |
| P1-6 | R1-2-4 | S | $C_2H_4$ | X-4 | $C_2H_4$ | S | P1-6 | 38,600 |
| P1-7 | R1-2-4 | S | $C_2H_4$ | X-4 | $C_2H_4$ | S | P1-7 | 69,000 |
| P1-8 | R1-2-4 | S | $C_2H_4$ | X-4 | $C_2H_4$ | S | P1-8 | 59,900 |
| P1-9 | R1-2-4 | S | $C_2H_4$ | X-4 | $C_2H_4$ | S | P1-9 | 63,100 |
| P1-10 | R1-2-4 | S | $C_2H_4$ | X-4 | $C_2H_4$ | S | P1-10 | 68,500 |
| P1-11 | R1-2-4 | S | $C_2H_4$ | X-4 | $C_2H_4$ | S | P1-11 | 59,200 |
| P1-12 | R1-2-4 | S | $C_2H_4$ | X-4 | $C_2H_4$ | S | P1-12 | 33,400 |
| P1-13 | R1-2-4 | S | $C_2H_4$ | X-4 | $C_2H_4$ | S | P1-13 | 74,200 |
| P1-14 | R1-2-4 | S | $C_2H_4$ | X-4 | $C_2H_4$ | S | P1-14 | 93,100 |
| P1-15 | R1-2-4 | S | $C_2H_4$ | X-4 | $C_2H_4$ | S | P1-15 | 63,500 |
| P1-16 | R1-2-4 | S | $C_2H_4$ | X-4 | $C_2H_4$ | S | P1-16 | 77,100 |
| P1-17 | R1-2-4 | S | $C_2H_4$ | X-4 | $C_2H_4$ | S | P1-17 | 63,400 |
| P1-18 | R1-2-4 | S | $C_2H_4$ | X-4 | $C_2H_4$ | S | P1-18 | 44,600 |
| P1-19 | R1-2-4 | S | $C_2H_4$ | X-4 | $C_2H_4$ | S | P1-19 | 61,800 |
| P1-20 | R1-2-4 | S | $C_2H_4$ | X-4 | $C_2H_4$ | S | P1-20 | 64,800 |
| P1-21 | R1-3-1 | S | $C_2H_4$ | X-4 | $C_2H_4$ | S | P1-1 | 33,100 |
| P1-22 | R1-3-1 | S | $C_2H_4$ | X-4 | $C_2H_4$ | S | P1-2 | 44,800 |
| P1-23 | R1-3-1 | S | $C_2H_4$ | X-4 | $C_2H_4$ | S | P1-3 | 25,300 |
| P1-24 | R1-3-1 | S | $C_2H_4$ | X-4 | $C_2H_4$ | S | P1-4 | 24,600 |
| P1-25 | R1-3-1 | S | $C_2H_4$ | X-4 | $C_2H_4$ | S | PT-5 | 28,900 |

TABLE 3

| Dispersant | $R^1$ | $A^1$ | $L^1$ | X | $L^2$ | $A^2$ | $P^1$ | Weight-average molecular weight |
|---|---|---|---|---|---|---|---|---|
| P1-26 | R1-3-1 | S | $C_2H_4$ | X-4 | $C_2H_4$ | S | P1-6 | 33,900 |
| P1-27 | R1-3-1 | S | $C_2H_4$ | X-4 | $C_2H_4$ | S | P1-7 | 19,100 |
| P1-28 | R1-3-1 | S | $C_2H_4$ | X-4 | $C_2H_4$ | S | P1-8 | 54,900 |
| P1-29 | R1-3-1 | S | $C_2H_4$ | X-4 | $C_2H_4$ | S | P1-9 | 46,300 |
| P1-30 | R1-3-1 | S | $C_2H_4$ | X-4 | $C_2H_4$ | S | P1-10 | 45,000 |
| P1-31 | R1-3-1 | S | $C_2H_4$ | X-4 | $C_2H_4$ | S | P1-11 | 63,200 |
| P1-32 | R1-3-1 | S | $C_2H_4$ | X-4 | $C_2H_4$ | S | P1-12 | 82,200 |

TABLE 3-continued

| Dispersant | $R^1$ | $A^1$ | $L^1$ | X | $L^2$ | $A^2$ | $P^1$ | Weight-average molecular weight |
|---|---|---|---|---|---|---|---|---|
| P1-33 | R1-3-1 | S | $C_2H_4$ | X-4 | $C_2H_4$ | S | P1-13 | 76,100 |
| P1-34 | R1-3-1 | S | $C_2H_4$ | X-4 | $C_2H_4$ | S | P1-14 | 60,900 |
| P1-35 | R1-3-1 | S | $C_2H_4$ | X-4 | $C_2H_4$ | S | P1-15 | 74,500 |
| P1-36 | R1-3-1 | S | $C_2H_4$ | X-4 | $C_2H_4$ | S | P1-16 | 35,300 |
| P1-37 | R1-3-1 | S | $C_2H_4$ | X-4 | $C_2H_4$ | S | P1-17 | 42,800 |
| P1-38 | R1-3-1 | S | $C_2H_4$ | X-4 | $C_2H_4$ | S | P1-18 | 93,100 |
| P1-39 | R1-3-1 | S | $C_2H_4$ | X-4 | $C_2H_4$ | S | P1-19 | 64,200 |
| P1-40 | R1-3-1 | S | $C_2H_4$ | X-4 | $C_2H_4$ | S | P1-20 | 71,300 |
| P1-41 | R1-2-4 | S | $C_2H_4$ | X-4 | $C_2H_4$ | S | P1-21 | 55,600 |
| P1-42 | R1-2-4 | S | $C_2H_4$ | X-4 | $C_2H_4$ | S | P1-22 | 58,300 |
| P1-43 | R1-2-4 | S | $C_2H_4$ | X-4 | $C_2H_4$ | S | P1-23 | 88,600 |
| P1-44 | R1-2-4 | S | $C_2H_4$ | X-4 | $C_2H_4$ | S | P1-24 | 61,000 |
| P1-45 | R1-2-4 | S | $C_2H_4$ | X-4 | $C_2H_4$ | S | P1-25 | 49,300 |
| P1-46 | R1-2-4 | S | $C_2H_4$ | X-4 | $C_2H_4$ | S | P1-1 | 95,300 |
| P1-47 | R1-2-4 | S | $C_2H_4$ | X-4 | $C_2H_4$ | S | P1-12 | 129,800 |

Production Method

A method for producing a dispersant according to an exemplary embodiment will now be described.

A dispersant represented by general formula (1) is synthesized through a known method.

A method for synthesizing a dispersant represented by general formula (1) which is a compound in which $A^1$ and $A^2$ each represent a sulfur atom is described as one non-limiting example below.

A compound, which is an example of the dispersant, represented by general formula (1) with $A^1$ and $A^2$ each representing a sulfur atom is obtained through reaction pathway 1) and reaction pathway 2) described below.

Pathway 1): A compound that contains an organic linking group represented by X in general formula (1) and m+n mercapto groups (hereinafter this compound may be referred to as a polythiol) and a compound that contains groups (for example, carbon-carbon double bonds) reactive to mercapto groups and that will form an organic group represented by $R^1$ in general formula (1) after reacting with mercapto groups in the polythiol are subjected to addition reaction, as a result of which an $R^1$ adduct of polythiol is obtained.

Pathway 2): The $R^1$ adduct of polythiol, a monomer represented by general formula (2-1), and, if needed, a monomer represented by general formula (3-1) and a monomer represented by general formula (4-1) are polymerized, as a result of which a dispersant represented by general formula (1) is obtained.

Examples of the compound (polythiol) that contains an organic linking group represented by X in general formula (1) and m+n mercapto groups include Example Compounds below.

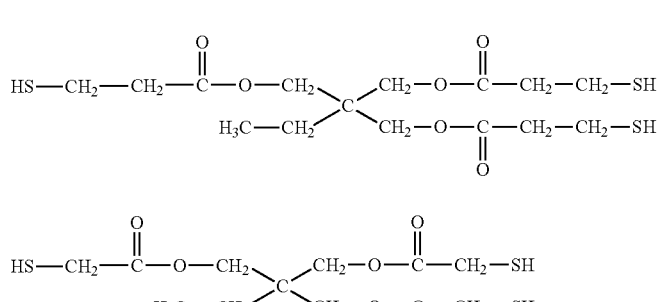

-continued
(3)
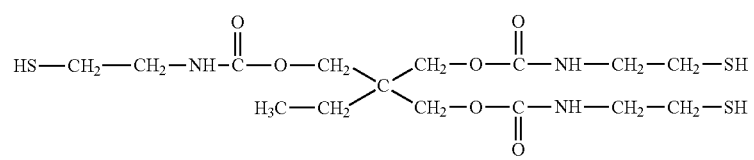
(4)
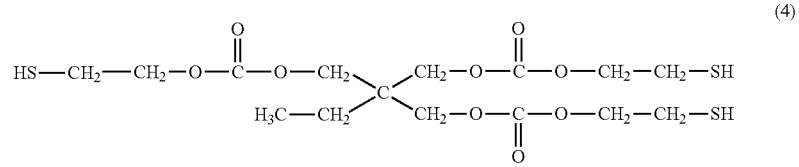
(5)
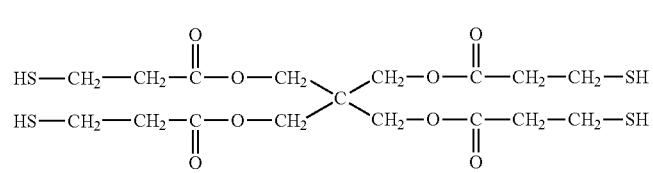
(6)
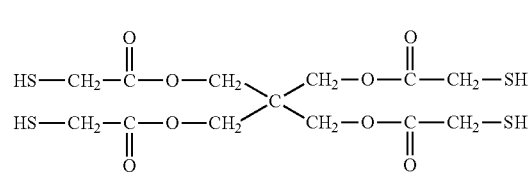
(7)
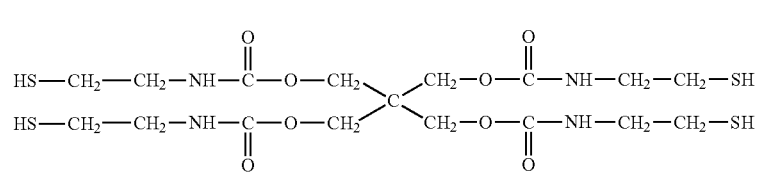
(8)
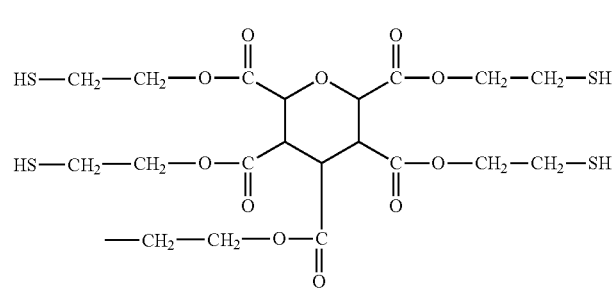
(9)
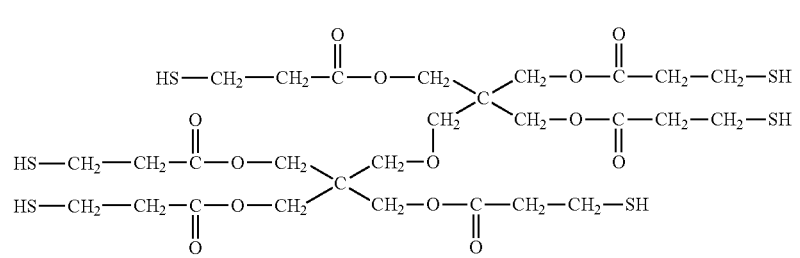
(10)
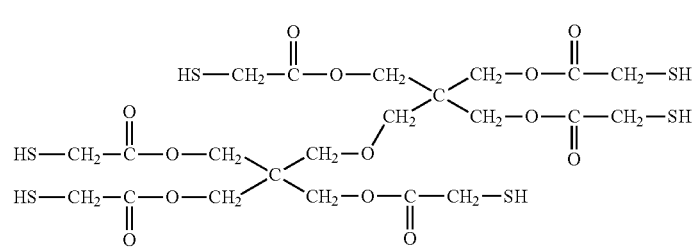

Specific examples of the compound that contains carbon-carbon double bonds as the groups reactive to mercapto groups and that will form an organic group represented by $R^1$ in general formula (1) after reacting with mercapto groups in the polythiol include Example Compounds below.
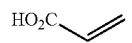
(R1-11-1)
(R1-11-2)
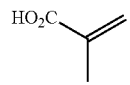
(R1-11-3)
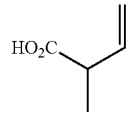
(R1-11-4)
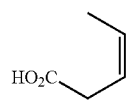
(R1-11-5)
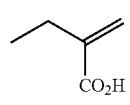
(R1-11-6)
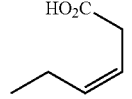
(R1-11-7)
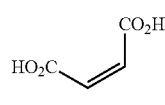
(R1-12-1)
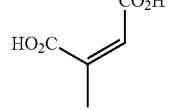
(R1-12-2)
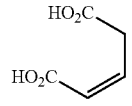
(R1-12-3)
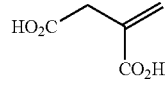
(R1-12-4)
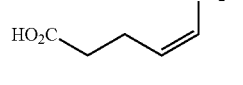
(R1-12-5)
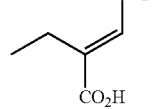
(R1-12-6)
-continued
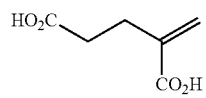
(R1-12-7)
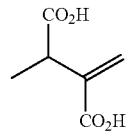
(R1-12-8)
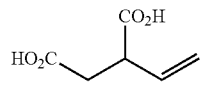
(R1-12-9)
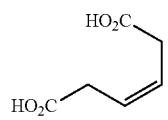
(R1-12-10)
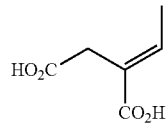
(R1-12-11)
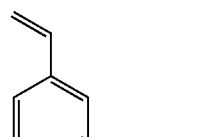
(R1-12-12)
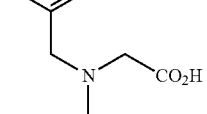
(R1-12-13)
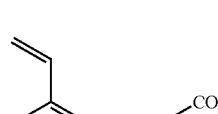
(R1-12-14)
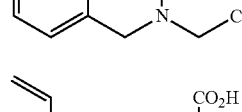
(R1-13-1)
(R1-13-2)

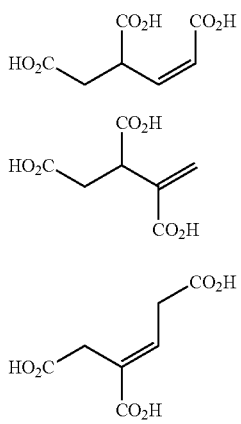
(R1-13-3)

(R1-13-4)

(R1-13-5)

Of the specific examples of the monomer represented by general formula (2-1), examples of the monomer in which the adhesive functional group is a sulfo group or a salt thereof include styrenesulfonic acid, 2-acrylamide-2-methylpropanesulfonic acid, 3-sulfopropyl(meth)acrylic acid ester, bis-(3-sulfopropyl)-itaconic acid ester, and salts thereof.

Of the specific examples of the monomer represented by general formula (2-1), examples of the monomer in which the adhesive functional group is an amino group include (meth)acrylates containing aliphatic amino groups such as N,N-dimethylaminoethyl (meth)acrylate, N,N-diethylaminoethyl (meth)acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; and styrenes containing amino groups such as dimethylaminostyrene, diethylaminostyrene, dimethylaminomethylstyrene, and dioctylaminostyrene.

Specific examples of the monomer represented by general formula (2-1) also include Example Compounds bellow.

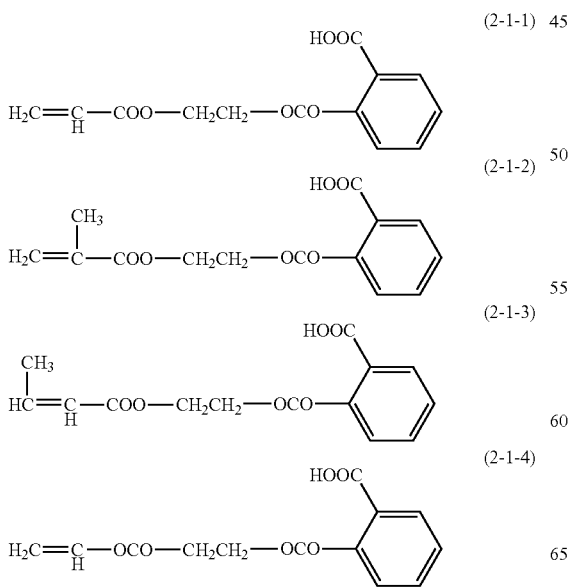

(2-1-1)

(2-1-2)

(2-1-3)

(2-1-4)

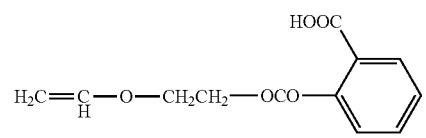
(2-1-5)

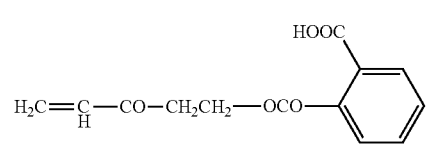
(2-1-6)

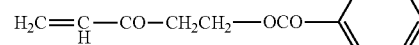
(2-1-7)

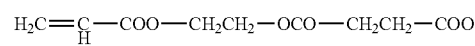
(2-1-8)

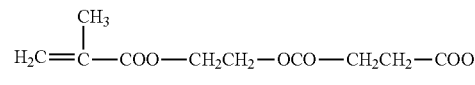
(2-1-9)

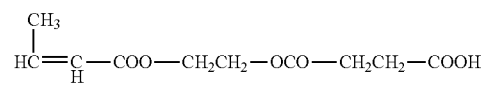
(2-1-10)

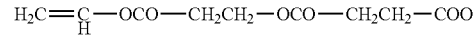
(2-1-11)

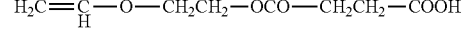
(2-1-12)

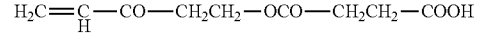
(2-1-13)

(2-1-14)

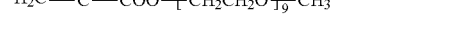
(2-1-15)

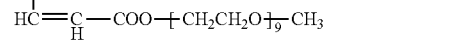
(2-1-16)

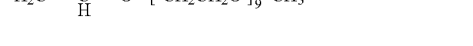
(2-1-17)

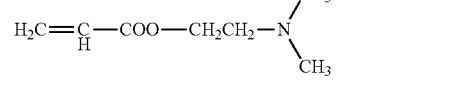
(2-1-18)

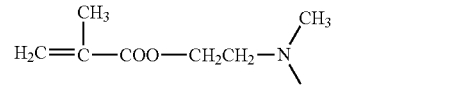
(2-1-19)

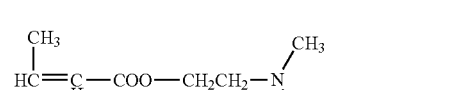
(2-1-20)

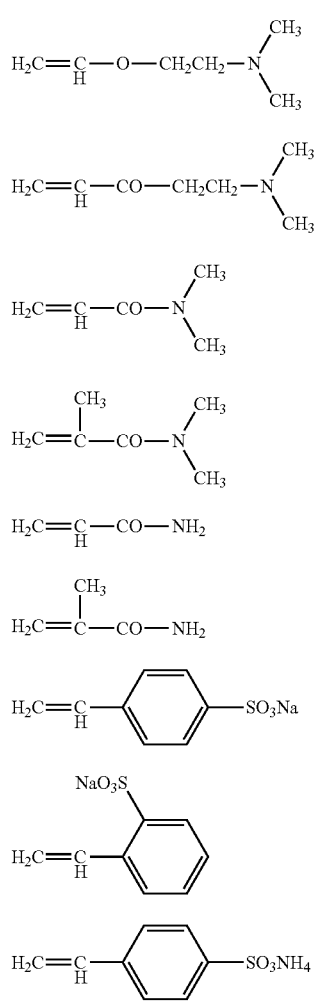

Specific examples of the monomer represented by general formula (3-1) include Example Compounds below.

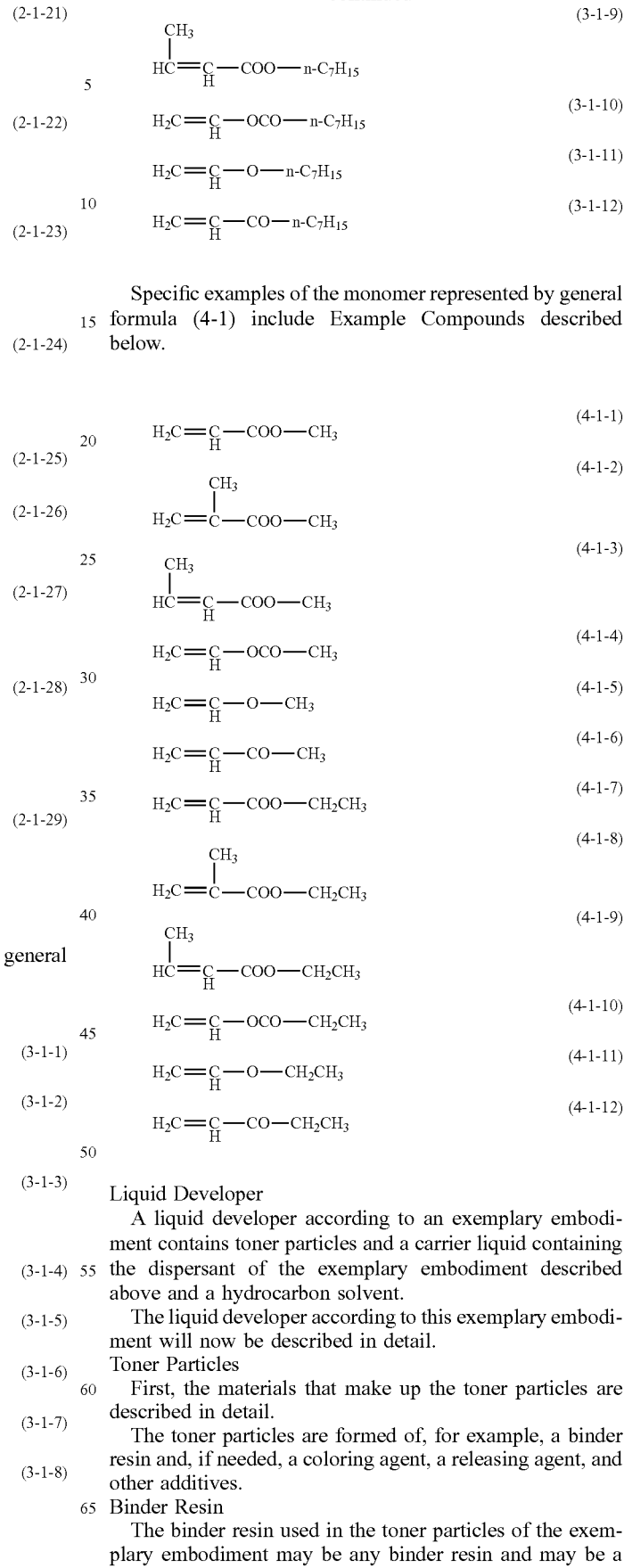

Specific examples of the monomer represented by general formula (4-1) include Example Compounds described below.

Liquid Developer

A liquid developer according to an exemplary embodiment contains toner particles and a carrier liquid containing the dispersant of the exemplary embodiment described above and a hydrocarbon solvent.

The liquid developer according to this exemplary embodiment will now be described in detail.

Toner Particles

First, the materials that make up the toner particles are described in detail.

The toner particles are formed of, for example, a binder resin and, if needed, a coloring agent, a releasing agent, and other additives.

Binder Resin

The binder resin used in the toner particles of the exemplary embodiment may be any binder resin and may be a binder resin synthesized by polyaddition reaction or polycondensation reaction from the viewpoints of low-temperature fixability and storage stability. Specific examples thereof include polyester resins, polyurethane resins, epoxy resins, and polyol resins. Among these, a polyester resin may be used as the binder resin due to its compatibility with the crystalline resin used in combination and the releasing agent encapsulation property.

In the exemplary embodiment, the binder resin may be a combination of a crystalline resin and an amorphous resin since a sharp fusion characteristic is obtained during fixing.

In this exemplary embodiment, a "crystalline resin" refers to a resin that has a clear endothermic peak in differential scanning calorimetry (DSC) instead of stepwise endothermic changes. Specifically, a "crystalline resin" refers to a crystalline resin having a weight-average molecular weight higher than 5,000 and normally refers to a crystalline resin having a weight-average molecular weight of 10,000 or more.

In this exemplary embodiment, an "amorphous resin" refers to a resin whose half-value-width exceeds 10° C., a resin that shows stepwise endothermic changes, or a resin having no clear endothermic peak.

Crystalline Resin

A crystalline resin has a fusion temperature and thus the viscosity thereof decreases significantly at a particular temperature. Thus, when the toner particles are heated during fixing, the difference in temperature from the start of the thermal activity of the crystalline resin molecules to completion of fixing can be decreased and good low-temperature fixability can be imparted. The crystalline resin content in the toner particles is, for example, 1% by mass or more and 10% by mass or less or 2% by mass or more and 8% by mass or less.

The crystalline resin used in this exemplary embodiment may have a fusion temperature (Tm) in the range of 45° C. or higher and 110° C. or lower in order to ensure the low-temperature fixability and storage stability of the toner particles. A more preferable range for the fusion temperature is 50° C. or higher and 100° C. or lower and a still more preferable range for the fusion temperature is 55° C. or higher and 90° C. or lower. The fusion temperature of the resin is determined by the method that complies with ASTM D3418-8.

The number-average molecular weight (Mn) of the crystalline resin is, for example, 2,000 or more or about 2,000 or more and may be 4,000 or more.

A crystalline resin used in the exemplary embodiment may be a resin having a weight-average molecular weight exceeding 5,000 and having crystallinity. Specific examples thereof include crystalline polyester resins and crystalline vinyl resins. A crystalline polyester resin, in particular, an aliphatic crystalline polyester resin having an appropriate fusion temperature, may be used as the crystalline resin.

Examples of the crystalline vinyl resin include vinyl resins that use (meth)acrylate esters of long-chain alkyl and alkenyl, such as amyl (meth)acrylate, hexyl (meth)acrylate, heptyl (meth)acrylate, octyl (meth)acrylate, nonyl (meth)acrylate, decyl (meth)acrylate, undecyl (meth)acrylate, tridecyl (meth)acrylate, myristyl (meth)acrylate, cetyl (meth)acrylate, stearyl (meth)acrylate, oleyl (meth)acrylate, and behenyl (meth)acrylate.

In this specification, "(meth)acryl" means both "acryl" and "methacryl" and "(meth)acrylate" means both "acrylate" and "methacrylate".

The crystalline polyester resin may be a polycondensate synthesized from a carboxylic acid (dicarboxylic acid) component and an alcohol (diol) component. The carboxylic acid component and the alcohol component are described in detail below. In this exemplary embodiment, a copolymer in which 50% by mass or less of other components are copolymerized with respect to the main chain of the crystalline polyester resin is also referred to as a crystalline polyester resin.

The carboxylic acid component may be an aliphatic dicarboxylic acid, in particular, a straight carboxylic acid. Examples thereof include, but are not limited to, oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid, and lower alkyl esters and acid anhydrides thereof.

The carboxylic acid component may contain, in addition to the above-described aliphatic dicarboxylic acid component, a dicarboxylic acid component having a double bond, a dicarboxylic acid component having a sulfonic acid group, etc. The dicarboxylic acid component having a double bond may be a component derived from a dicarboxylic acid having a double bond or a component derived from a lower alkyl ester or acid anhydride of a dicarboxylic acid having a double bond. The dicarboxylic acid component having a sulfonic acid group may be a component derived from a dicarboxylic acid having a sulfonic acid group or a component derived from a lower alkyl ester or acid anhydride of a dicarboxylic acid having a sulfonic acid group.

The dicarboxylic acid having a double bond allows the whole resin to be crosslinked owing to its double bond. Examples of the dicarboxylic acid include, but are not limited to, fumaric acid, maleic acid, 3-hexenedioic acid, and 3-octenedioic acid, and lower alkyl esters and acid anhydrides thereof. Among these, for example, fumaric acid or maleic acid may be used from the viewpoint of cost.

A dicarboxylic acid having a sulfonic acid group is effective for enhancing dispersing of a coloring material such as a pigment. When sulfonic acid groups are present in making particles by emulsifying or suspending the entire resin in water, emulsification or suspension is achieved without using a surfactant, as described below. Examples of the dicarboxylic acid having a sulfonic acid group include, but are not limited to, sodium 2-sulfoterephthalate, sodium 5-sulfoisophthalate, and sodium sulfosuccinate, and lower alkyl esters and acid anhydrides thereof. Among these, for example, sodium 5-sulfoisophthalate may be used from the viewpoint of cost.

The carboxylic acid components (the dicarboxylic acid component having a double bond and the dicarboxylic acid component having a sulfonic acid group) other than the above-described aliphatic dicarboxylic acid component may account for 1 to 20 constitutional mole % or 2 to 10 constitutional mole % of all the carboxylic acid components.

In this exemplary embodiment the "constitutional mole %" refers to a percentage on the assumption that each of the components (such as the carboxylic acid component and the alcohol component) constituting the polyester resin constitutes one unit (mole).

The alcohol component may be an aliphatic diol. Examples thereof include, but are not limited to, ethylene glycol, 1, 3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol.

The aliphatic diol component may account for 80 constitutional mole % or more or 90 constitutional mole % or more of the alcohol component. The alcohol component may contain other components.

Examples of these other components include a diol component having a double bond and a diol component having a sulfonic acid group.

Examples of the diol having a double bond include 2-butene-1,4-diol, 3-hexene-1,6-diol, and 4-octene-1,8-diol. Examples of the diol having a sulfonic acid group include 1,4-dihydroxy-2-sulfonic acid benzene sodium salt, 1,3-dihydroxymethyl-5-sulfonic acid benzene sodium salt, and 2-sulfo-1,4-butanediol sodium salt.

When these alcohol components (the diol component having a double bond and the diol component having a sulfonic acid group) other than the straight aliphatic diol components are added, they may account for 1 to 20 constitutional mole % and more preferably 2 to 10 constitutional mole % of the alcohol component.

The method for producing the crystalline polyester resin is not particularly limited. The crystalline polyester resin is produced by a typical polyester polymerization method that involves reacting a carboxylic acid component with an alcohol component. Examples of the method include a direct polycondensation method and an ester exchange method. Depending on the type of the monomer, an appropriate method is selected for production. The molar ratio (acid component/alcohol component) used to react the acid component with the alcohol comment differs depending on the reaction conditions and other factors but is usually 1/1.

The production of the crystalline polyester resin is conducted in the polymerization temperature range of 180° C. or higher and 230° C. or lower. Water and alcohol generated during condensation are removed while conducting the reaction. The pressure in the reaction system may be decreased. When the monomer does not dissolve or mix at the reaction temperature, a solvent having a high boiling point may be added as a dissolving aid to promote dissolution. In the polycondensation reaction, reaction is conducted while distilling away the solvent for assisting dissolution. When monomers having poor compatibility with each other are present in copolymerization reaction, the monomer having poor compatibility and a carboxylic acid component or an alcohol component to be polycondensed with that monomer may be condensed in advance and then the resulting product may be polycondensed with the main component.

Examples of the catalyst that can be used in producing the crystalline polyester resin include alkali metal compounds such as those of sodium and lithium; alkaline earth metal compounds such as those of magnesium and calcium; metal compounds such as those of zinc, manganese, antimony, titanium, tin, zirconium, and germanium; and phosphite compounds, phosphate compounds, and amine compounds. Specific examples of these are as follows.

Examples of the catalyst include compounds such as sodium acetate, sodium carbonate, lithium acetate, calcium acetate, zinc stearate, zinc naphthenate, zinc chloride, manganese acetate, manganese naphthenate, titanium tetraethoxide, titanium tetrapropoxide, titanium tetraisopropoxide, titanium tetrabutoxide, antimony trioxide, triphenyl antimony, tributyl antimony, tin formate, tin oxalate, tetraphenyl tin, dibutyl tin dichloride, dibutyl tin oxide, diphenyl tin oxide, zirconium tetrabutoxide, zirconium naphthenate, zirconyl carbonate, zirconyl acetate, zirconyl stearate, zirconyl octylate, germanium oxide, triphenyl phosphite, tris(2,4-di-t-butylphenyl) phosphite, ethyl triphenyl phosphonium bromide, triethylamine, and triphenylamine.

In order to adjust the fusion temperature, molecular weight, and other properties of the crystalline resin, a compound having a shorter alkyl group, an alkenyl group, an aromatic ring, or the like may be used in addition to the polymerizable monomers described above.

For dicarboxylic acids, specific examples thereof include alkyl dicarboxylic acids such as succinic acid, malonic acid, and oxalic acid; aromatic dicarboxylic acids such as phthalic acid, isophthalic acid, terephthalic acid, homophthalic acid, 4,4'-bibenzoic acid, 2,6-naphthalenedicarboxylic acid, and 1,4-naphthalenedicarboxylic acid; and nitrogen-containing aromatic dicarboxylic acids such as dipicolinic acid, dinicotinic acid, quinolinic acid, and 2,3-pyrazinedicarboxylic acid. For diols, specific examples thereof include diols of short-chain alkyls such as succinic acid, malonic acid, acetonedicarboxylic acid, and digylcolic acid. For the vinyl polymerizable monomer of short-chain alkyls, specific examples include (meth)acrylate esters of short-chain alkyl and alkenyl such as methyl (meth)acrylate, ethyl (meth)acrylate, propyl (meth)acrylate, and butyl (meth)acrylate; vinyl nitriles such as acrylonitrile and methacrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as ethylene, propylene, butadiene, and isoprene. These polymerizable monomers may be used alone or in combination.

Amorphous Resin

A known amorphous binder resin for toner particles, such as a styrene-acrylic resin or a polyester resin, can be used as the amorphous resin in the exemplary embodiment. The amorphous resin may be an amorphous polyester resin.

The glass transition temperature (Tg) of the amorphous polyester resin may be in the range of 50° C. or higher and 80° C. or lower or about 50° C. or higher and about 80° C. or lower, or 55° C. or higher and 65° C. or lower. The weight-average molecular weight may be in the range of 8,000 or more and 30,000 or less or in the range of 8,000 or more and 16,000 or less. A third component may be copolymerized.

The amorphous polyester resin may have an alcohol component or a carboxylic acid component common to the crystalline polyester resin used in combination in order to enhance miscibility.

The method for producing the amorphous polyester resin is not particularly limited and a typical polyester polymerization method such as one described above may be employed.

Examples of the carboxylic acid component used in synthesizing the amorphous polyester resin include above-described dicarboxylic acids given as the examples related to the crystalline polyester resin. Various diols used in synthesizing amorphous polyester resins may be used as the alcohol component. Examples of the alcohol component include aliphatic diols described above as examples related to the polyester resin, bisphenol A, bisphenol A ethylene oxide adducts, bisphenol A propylene oxide adducts, hydrogenated bisphenol A, bisphenol S, bisphenol S ethylene oxide adducts, and bisphenol S propylene oxide adducts.

From the viewpoints of manufacturability, heat resistance, and transparency of toner particles, bisphenol S and derivatives thereof such as bisphenol S ethylene oxide adducts and bisphenol S propylene oxide adducts may be used. Two or more carboxylic acid components and/or two or more alcohol components may be contained. In particular, bisphenol S has an effect of improving heat resistance.

From the viewpoint of low-temperature fixability, one or both of the alcohol component and the carboxylic acid component used to form the amorphous polyester resin may contain an aliphatic component.

From the viewpoint of low-temperature fixability, one or both of the alcohol component and the carboxylic acid component of one of the polyester resin selected from the crystalline polyester resin and the amorphous polyester resin may contain an aliphatic component. This also enhances the plasticizing effect of the specific paraffin oil on the binder resin.

In order to further improve low-temperature fixability, at least one selected from the alcohol component and the carboxylic acid component may be solely formed of a polyester resin containing an aliphatic component. Specifically, at least one selected from the alcohol component and the carboxylic acid component of each of the polyester resins constituting the amorphous polyester resin and the crystalline polyester resin used in combination may contain an aliphatic component.

In order to further enhance the low-temperature fixability, the polyester resin may be a polycondensate of an alcohol component containing an aliphatic diol and a carboxylic acid component containing an aliphatic dicarboxylic acid (including an acid anhydride or a lower (for example, C1 to C5) alkyl ester of the acid).

From the same viewpoint, a polycondensate of an alcohol component containing a C4-C14 aliphatic diol and a carboxylic acid component containing C6-C16 (including the carbon of the carboxy group) aliphatic dicarboxylic acid is more preferable. A polycondensate of an alcohol component containing a C4-C8 aliphatic diol and a carboxylic acid component containing C8-C14 (including the carbon of the carboxy group) aliphatic dicarboxylic acid is yet more preferable.

Next, the amorphous resin used as the binder resin, the crosslinking treatment of the crystalline resin, and the copolymerization components that can be used in synthesizing the binder resin are described.

In synthesizing the binder resin, other components may be copolymerized or a compound having a hydrophilic polar group may be used.

When the binder resin is a polyester resin, examples include dicarboxylic acid compounds in which an aromatic ring is directly substituted with a sulfonyl group, such as sodium sulfonyl-terephthalate and sodium 3-sulfonylisophthalate. When the binder resin is a vinyl resin, examples include unsaturated aliphatic carboxylic acids such as (meth)acrylic acid and itaconic acid, esters of (meth)acrylic acids and alcohols such as glycerin mono (meth)acrylate, aliphatic acid-modified glycidyl (meth)acrylate, zinc mono(meth)acrylate, zinc di(meth)acrylate, 2-hydroxyethyl (meth)acrylate, polyethylene glycol (meth)acrylate, and polypropylene glycol (meth)acrylate, styrene derivatives having a sulfonyl group at the ortho-, meta-, or para-position, and sulfonyl-substituted aromatic vinyls such as sulfonyl-containing vinyl naphthalene.

A crosslinking agent may be added to the binder resin.

Specific examples of the crosslinking agent include aromatic polyvinyl compounds such as divinyl benzene and divinyl naphthalene; polyvinyl esters of aromatic polyvalent carboxylic acids such as divinyl phthalate, divinyl isophthalate, divinyl terephthalate, divinyl homophthalate, divinyl/trivinyl trimesate, divinyl naphthalene dicarboxylate, and divinyl biphenyl carboxylate; divinyl esters of nitrogen-containing aromatic compounds such as divinyl pyridine dicarboxylate; unsaturated heterocyclic compounds such as pyrrole and thiophene; vinyl esters of unsaturated heterocyclic compound carboxylic acids such as vinyl pyromucate, vinyl furancarboxylate, vinyl pyrrole-2-carboxylate, and vinyl thiophenecarboxylate; (meth)acrylate esters of straight polyhydric alcohols such as butanediol methacrylate, hexanediol acrylate, octanediol methacrylate, decanediol acrylate, and dodecanediol methacrylate; (meth)acrylate esters of branched and substituted polyhydric alcohols such as neopentyl glycol dimethacrylate and 2-hydroxy-1,3-diacryloxypropane; polyethylene glycol di(meth)acrylates and polypropylene polyethylene glycol di(meth)acrylates; and polyvinyl esters of polyvalent carboxylic acids such as divinyl succinate, divinyl fumarate, vinyl/divinyl maleate, divinyl diglycolate, vinyl/divinyl itaconate, divinyl acetonedicarboxylate, divinyl glutarate, divinyl 3,3'-thiodipropionate, divinyl/trivinyl trans-aconitate, divinyl adipate, divinyl pimelate, divinyl suberate, divinyl azelate, divinyl sebacate, divinyl dodecanedioate, and divinyl brassylate.

In particular, for the crystalline polyester resin, an unsaturated polycarboxylic acid such as fumaric acid, maleic acid, itaconic acid, or trans-aconitic acid may be copolymerized into the polyester and then the multiple bonds in the resin may be crosslinked with one another or another vinyl compound may be used to perform crosslinking. In the exemplary embodiment, these crosslinking agents may be used alone or in combination.

A method for performing crosslinking using these crosslinking agents may be a method that involves copolymerizing polymerizable monomers and a crosslinking agent during polymerization of the monomers. Alternatively, the unsaturated segments may be allowed to remain in the binder resin and then crosslinked with each other through crosslinking reaction after polymerization of the binder resin or after preparation of the toner particles.

When the binder resin is a polyester resin, the binder resin is obtained by polycondensation of a polymerizable monomer. The catalyst for polycondensation is a known catalyst. Specific examples of the catalyst include titanium tetrabutoxide, dibutyl tin oxide, germanium dioxide, antimony trioxide, tin acetate, zinc acetate, and tin disulfide. When the binder resin is a vinyl resin, the binder resin is obtained by radical polymerization of a polymerizable monomer.

The radical polymerization initiator may be any initiator that can induce emulsion polymerization. Specific examples of the initiator include peroxides such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, peroxycarbonate diisopropyltetralin hydroperoxide, 1-phenyl-2-methylpropyl-1-hydroperoxide, tert-butylhydroperoxide pertriphenylacetate, tert-butyl performate, tert-butyl peracetate, tert-butyl perbenzoate, tert-butyl perphenylacetate, tert-butyl permethoxyacetate, and tert-butyl per-N-(3-toluyl)carbamate; azo compounds such as 2,2'-azobispropane, 2,2'-dichloro-2,2'-azobispropane, 1,1'-azo(methylethyl) diacetate, 2,2'-azobis(2-aminodipropane) hydrochloric acid salt, 2,2'-azobis(2-aminodipropane) nitric acid salt, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1,1'-azobis-1,2-diphenylethane, poly(bisphenol A-4,4'-azobis-4-cyanopentanoate), and poly(tetraethylene glycol 2,2'-azobis isobutyrate); and 1,4-bis(pentaethylene)-2-tetrazene and 1,4-dimethoxycarbonyl-1,4-diphenyl-2-tetrazene. These polymerization initiators are also used as an initiator for crosslinking reaction.

Although crystalline polyester resins and amorphous polyester resins have been mainly described as the binder resin, other types of resin may be used as the binder resin. Examples of such resins include styrenes such as styrene, parachlorostyrene, and α-methylstyrene; acrylic monomers such as methyl acrylate, ethyl acrylate, n-propyl acrylate, butyl acrylate, lauryl acrylate, and 2-ethylhexyl acrylate; methacrylic monomers such as methyl methacrylate, ethyl methacrylate, n-propyl methacrylate, lauryl methacrylate, and 2-ethylhexyl methacrylate; ethylene unsaturated acid monomers such as acrylic acid, methacrylic acid, and sodium styrenesulfonate; vinylnitriles such as acrylonitrile and methacrylonitrile; vinyl ethers such as vinyl methyl ether and vinyl isobutyl ether; vinyl ketones such as vinyl methyl ketone, vinyl ethyl ketone, and vinyl isopropenyl ketone; homopolymers of olefin monomers such as ethylene, propylene, and butadiene, copolymers formed of two or more of these monomers, any mixtures of these homopolymers and copolymers, non-vinyl condensed resins such as epoxy resins, polyester resins, polyurethane resins, polyamide resins, cellulose resins, and polyether resins, mixtures of the vinyl resins and the non-vinyl condensed resins, and graft polymers obtained by polymerizing vinyl monomers in the presence of the foregoing.

When the toner particles of the exemplary embodiment are produced by an emulsion polymerization aggregation method as described below, the resin described above is prepared into a resin particle dispersion. The resin particle dispersion is easily obtained by an emulsion polymerization method or an inhomogeneous dispersive system polymerization method similar to the emulsion polymerization. Alternatively, the dispersion can be obtained by any other method, such as a method that involves adding a stabilizer and a polymer, which has been prepared in advance by a solution polymerization method or a bulk polymerization method, to a solvent that does not dissolve the polymer and mechanically mixing and dispersing the resulting mixture.

For example, when a vinyl monomer is used, the resin particle dispersion can be prepared by an emulsion polymerization method or a seed polymerization method by using an ionic surfactant or a combination of an ionic surfactant and nonionic surfactant.

The surfactant may be any surfactant. Examples of the surfactant include, but are not limited to, anionic surfactants such as sulfate esters, sulfonate esters, phosphate esters, and soaps; cationic surfactants such as amine salts and quaternary ammonium salts; nonionic surfactants such as polyethylene glycol, alkyl phenol ethylene oxide adducts, alkyl alcohol ethylene oxide adducts; and polyhydric alcohols, and various graft polymers.

When the resin particle dispersion is prepared by emulsion polymerization, an unsaturated acid, e.g., acrylic acid, methacrylic acid, maleic acid, or styrenesulfonic acid, may be added as a part of the monomer component. In this manner, a protective colloid layer is formed on a particle surface and a soap-free polymerization can be conducted.

The volume-average particle diameter of the resin particles may be 1 μm or less or may be 0.01 μm or more and 1 μm or less. The average particle diameter of the resin particles is measured with a laser diffraction particle size distribution meter (SALD-2000A produced by Shimadzu Corporation).

The weight-average molecular weight and the number-average molecular weight are values measured by gel permeation chromatography (GPC). Measurement is conducted by using "HLC-8120GPC, SC-8020" produced by Tosoh Corporation as the measurement instrument with two "TSK-gel Super HM-M" (6.0 mm ID×15 cm) columns produced by Tosoh Corporation and tetrahydrofuran (THF) as the eluent. Experiment is conducted under the following conditions using a refractive index detector: sample concentration; 0.5%, flow rate: 0.6 ml/min, sample injection: 10 μl, measurement temperature: 40° C. Calibration curves are obtained by using ten polystyrene standard samples, namely, TSK standard: "A-500", "F-1", "F-10", "F-80", "F-380", "A-2500", "F-4", "F-40", "F-128", and "F-700" produced by Tosoh Corporation.

Releasing Agent

Examples of the releasing agent used in this exemplary embodiment include low-molecular-weight polyolefins such as polyethylene, polypropylene, and polybutene; aliphatic acid amides such as silicones, oleic acid amide, erucic acid amide, ricinoleic acid amide, and stearic acid amide; vegetable wax such as carnauba wax, rice wax, candelilla wax, wood wax, and jojoba oil; animal wax such as beeswax; mineral and petroleum wax such as montan wax, ozocerite, ceresin, paraffin wax, microcrystalline wax, and Fischer-Tropsch wax; and modifications of the foregoing.

When toner particles are prepared by an emulsion polymerization aggregation method, the releasing agent is dispersed in water along with an ionic surfactant and a polymer electrolyte such as a polyacid and polybase. The resulting dispersion may be heated to a temperature equal to or higher than the melting temperature and particles may be formed by using a homogenizer or a pressure-discharge type disperser that can apply high shear force so that a releasing agent particle dispersion containing particles of the releasing agent having an average diameter of 1 μm or less is obtained.

These releasing agent particles may be added to the mixed solvent all at once along with other resin particle components in preparing the toner particles or in divided portions.

The amount of the releasing agent added relative to the entirety of the toner particles may be in the range of 0.5% by mass or more and 50% by mass or less, 1% by mass or more and 30% by mass or less, or 5% by mass or more and 15% by mass or less.

The average dispersion diameter of the releasing agent that is dispersed and contained in the toner particles of the exemplary embodiment may be in the range of 0.3 μm or more and 0.8 μm or less or may be in the range of 0.4 μm or more and 0.8 μm or less.

The standard deviation of the dispersion diameter of the releasing agent may be 0.05 or less or may be 0.04 or less.

The average dispersion diameter of the releasing agent dispersed and contained in the toner particles is determined by analyzing a transmission electron microscope (TEM) image with an image analyzer (Luzex image analyzer produced by NIRECO CORPORATION) and calculating the average of the dispersion diameter (=(long axis+short axis)/2) of the releasing agent in 100 toner particles. The standard deviation is determined based on the respective dispersion diameters determined by this process.

The exposure ratio of the releasing agent at the surfaces of the toner particles may be in the range of 5 atom % or more and 12 atom % or less or may be in the range of 6 atom % or more and 11 atom % or less.

The exposure ratio is determined by X-ray photoelectron spectroscopy (XPS). As the XPS analyzer, JPS-9000MX produced by JEOL Ltd., is used. Measurement is conducted by using a Mg Kα line as the X-ray source at an acceleration voltage of 10 kV and an emission current set to 30 mA. The amount of the releasing agent at the toner particle surfaces is determined by a peak splitting method from a C1s spectrum. The peak splitting involves splitting the observed C1s spectrum into respective components by a least squares fitting method. The component spectra used as the basis of splitting are the C1s spectra separately obtained from the releasing agent, the binder resin, and the crystalline resin used in making the toner particles.

Coloring Agent

Examples of the coloring agent used in the exemplary embodiment include pigments such as carbon black, chrome yellow, hansa yellow, benzidine yellow, threne yellow, quinoline yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, rose bengal, aniline blue, ultramarine blue, calco oil blue, methylene blue chloride, phthalocyanine blue, phthalocyanine green, and malachite green oxalate, and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes. These coloring agents may be used alone or in combination.

When toner particles are prepared by an emulsion polymerization aggregation method, the coloring agent is dispersed in the solvent and used as the coloring agent particle dispersion. In such a case, the volume-average particle diameter of the coloring agent particles may be 0.8 μm or less or may be 0.05 μm or more and 0.5 μm or less.

The proportion of the coarse particles having a volume-average particle diameter of 0.8 μm or more in the coloring agent particle dispersion may be less than 10 number % and may be 0 number %. The proportion of the particles having an average particle diameter of 0.05 μm or less in the coloring agent particle dispersion may be 5 number % or less.

The volume-average particle diameter of the coloring agent particles is also measured with a laser diffraction particle size distribution meter (SALD-2000A produced by Shimadzu Corporation). The amount of the coloring agent added relative to the entirety of the toner particles may be in the range of 1% by mass or more and 20% by mass or less.

The method for dispersing the coloring agent in a solvent may be any. For example, a rotational shear-type homogenizer or a media mill such as a ball mill, a sand mill, or a dyno mill may be used.

The coloring agent may be surface-modified with a rosin, a polymer, or the like, and used. The surface-modified coloring agent is stable in the coloring agent particle dispersion. Thus, when the coloring agent is dispersed to an average particle diameter suitable for the coloring agent particle dispersion and then mixed with the resin particle dispersion, particles of the coloring agent do not aggregate in the aggregation step and can maintain a satisfactory dispersed state.

Examples of the polymer used for the surface treatment of the coloring agent include acrylonitrile polymers and methyl methacrylate polymers.

For the surface modification, typically, a polymerization method with which the monomer is polymerized in the presence of the coloring agent (pigment) or a phase separation method with which the coloring agent (pigment) is dispersed in a polymer solution and the dissolving power of the polymer is decreased to have the coloring agent (pigment) precipitate on the surfaces is employed.

Other Additives

When the toner particles of the exemplary embodiment are used as magnetic toner particles, magnetic powder is added. Examples of the magnetic powder include magnetic oxides such as ferrite and magnetite; magnetic metals such as reduced iron, cobalt, nickel, and manganese; and alloys and compounds containing these magnetic metals. Various charge controllers commonly used, such as quaternary ammonium salts, nigrosine compounds, and triphenylmethane pigments, may be added.

The toner particles of the exemplary embodiment may contain inorganic particles. From the viewpoint of durability, inorganic particles having a center particle diameter of 5 nm or more and 30 nm or less and inorganic particles having a center particle diameter of 30 nm or more and 100 nm or less may be contained in a total amount of 0.5% by mass or more and 10% by mass or less relative to the toner.

Examples of the inorganic particles include silica, hydrophobized silica, titanium oxide, alumina, calcium carbonate, magnesium carbonate, tricalcium phosphate, colloidal silica, cationically surface-treated colloidal silica, and anionically surface-treated colloidal silica. These inorganic particles are dispersed in advance in the presence of an ionic surfactant by using an ultrasonic disperser or the like. Alternatively, colloidal silica, which does not require such dispersion treatment, may be used.

A known external additive may be externally added to the toner particles of the exemplary embodiment. Examples of the external additive include inorganic particles such as silica, alumina, titania, calcium carbonate, magnesium carbonate, and tricalcium phosphate. Examples of the flowability aid and a cleaning aid include inorganic particles such as silica, alumina, titania, and calcium carbonate particles, and resin particles such as vinyl resin, polyester resin, and silicone resin particles. The method for external addition is not particularly limited. For example, the external additive may be added to the toner particle surface by applying shear force in a dry state.

Production of the toner particles according to an exemplary embodiment will now be described.

The toner according to the exemplary embodiment may be produced by any known toner production method. In particular, in order to control the elemental constitution of the toner particle surfaces described above, a wet production method may be employed, which involves a particle forming step of forming color particles that contain a binder resin and a coloring agent in water, an organic solvent, or a mixture of water and an organic solvent, and a washing and drying step of washing and drying the color particles.

Examples of the wet production method include, but are not limited to, a suspension polymerization method, a dissolution suspension method, and an emulsion aggregation method. The suspension polymerization method involves suspending a coloring agent, a releasing agent, and other components along with a polymerizable monomer that forms a binder resin such as an amorphous resin and polymerizing the polymerizable monomer. The dissolution suspension method involves dissolving the above-described toner constitutional materials, such as a compound having an ionic dissociation group, a binder resin, a coloring agent, and a releasing agent, in an organic solvent, dispersing the resulting solution in a water-based solvent so as to form a suspension, and removing the organic solvent from the suspension. The emulsion polymerization aggregation method involves preparing a binder resin component, such as an amorphous resin, by emulsion polymerization, causing the resulting binder resin component and dispersions of a pigment, a releasing agent, etc., to undergo heteroaggregation, and fusing and uniting the resulting product. Among these methods, the emulsion polymerization aggregation method offers superior toner particle diameter controllability, narrow particle size distribution, shape controllability, narrow shape distribution, and internal dispersion controllability, etc.

When the emulsion polymerization aggregation method is employed, for example, the toner particles according to the exemplary embodiment can be produced through an aggregation step of forming aggregated particles in a raw material dispersion that contains a resin particle dispersion in which a binder resin such as an amorphous resin or a crystalline resin is dispersed, a coloring agent particle dispersion in which a coloring agent is dispersed, and a releasing agent particle dispersion in which a releasing agent is dispersed; and a fusing step of heating the resulting raw material dispersion containing aggregated particles to a temperature equal to or higher than the glass transition temperature (or a melting temperature of the crystalline resin) of the binder resin so as to fuse the aggregated particles together. Alternatively, to the raw material dispersion, other dispersions such as an inorganic particle dispersion may be added. In particular, when a dispersion of inorganic particles having hydrophobized surfaces is added, dispersibility of the releasing agent and the crystalline resin inside the toner particles can be controlled by adjusting the degree of hydrophobicity.

A method for producing toner particles according to the exemplary embodiment will now be described in more detail by taking an example of the emulsion polymerization aggregation method.

When the toner particles of the exemplary embodiment are to be produced by the emulsion polymerization aggregation method, at least the aggregation step and the fusing step are conducted. Alternatively, an attaching step of forming a core-shell-structured aggregated particles by causing resin particles to attach to the surfaces of the aggregated particles (core particles) prepared through the aggregation step may be provided.

Aggregation Step

In the aggregation step, aggregated particles are formed in a raw material dispersion prepared by mixing a resin particle dispersion in which the binder resin, such as an amorphous resin or a crystalline resin, is dispersed (a dispersion of an amorphous resin and a dispersion of a crystalline resin may be prepared separately), a coloring agent particle dispersion in which a coloring agent is dispersed, and a releasing agent particle dispersion in which a releasing agent is dispersed. Specifically, the raw material dispersion prepared by mixing these dispersions is heated to induce aggregation of the particles in the raw material dispersion so as to form aggregated particles. The heating temperature is lower than the glass transition temperature of the amorphous resin and may be in the range of 5° C. to 25° C. lower than the glass transition temperature of the amorphous resin.

Aggregated particles are formed by adding an aggregating agent to the raw material dispersion at room temperature (23° C.) under stirring with a rotational shear-type homogenizer so as to adjust pH of the raw material dispersion to acidic.

The aggregating agent used in the aggregation step may be a surfactant having a polarity opposite to the surfactant used as the dispersant added to the raw material dispersion. Examples of the aggregating agent include inorganic metal salts and divalent or higher valent metal complexes. When a metal complex is used, the amount of the surfactant used is reduced and charge characteristics are improved.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide. Among these, aluminum salts and polymers thereof are particularly favorable. In order to obtain a shaper particle size distribution (narrow particle size distribution), the valence of the inorganic metal salt may be high, for example, 2 is better than 1, 3 is better than 2, and 4 is better than 3. If the valence is the same, a polymer-type inorganic metal salt polymer is more suitable.

In this exemplary embodiment, in order to control the proportions of the IIA elements, the IIIB elements, and the IVB elements (excluding carbon), an inorganic particle dispersion containing the inorganic metal salt may be added in the aggregation step in conducting aggregation. As a result, the inorganic metal salt effectively reacts with the terminals of the molecular chains of the binder resin and contributes to formation of the crosslinking structure.

The inorganic particle dispersion is prepared by the same method as that for preparing the coloring agent particle dispersion or the like. The dispersion average particle diameter of the inorganic particles may be in the range of 100 nm or more and 500 nm or less.

In the aggregation step, the inorganic particle dispersion may be added in divided portions in stages or added continuously. This is effective in achieving the intended proportion from the toner particle surface toward the interior of the particle. When the inorganic particle dispersion is added in stages, the number of stages may be 3 or more. When the inorganic particle dispersion is continuously added, the rate of adding the dispersion may be as low as 0.1 g/min or less.

The amount of the inorganic particle dispersion added differs depending on the type of the metal needed and the degree of crosslinking. For example, the amount may be in the range of 0.5 parts by mass or more and 10 parts by mass or less or in the range of 1 part by mass or more and 5 parts by mass or less relative to 100 parts by mass of the binder resin component.

After the aggregation step, an attaching step may be performed. In the attaching step, resin particles are attached to the surfaces of the aggregated particles formed through the aggregation step described above so as to form coating layers. As a result, core-shell toner particles formed of core layers and coating layers covering the core layers are obtained.

The coating layers are typically formed by further adding a dispersion containing amorphous resin particles to the dispersion in which aggregated particles (core particles) are formed in the aggregation step. The amorphous resin used in the attaching step may be the same or different from one used in the aggregation step.

Typically, the attaching step is employed to form toner particles having a core-shell structure in which a crystalline resin is contained as the main component of the binder resin along with the releasing agent. The purpose of performing the attaching step is to suppress exposure of the crystalline resin and the releasing agent contained in the core layers at the toner particle surfaces and to enhance strength of the toner particles.

Fusing Step

In the fusing step performed after the aggregation step or after the aggregation step and the attaching step, pH of the suspension containing aggregated particles formed through the preceding steps is adjusted to be in an intended range so that aggregation is stopped, and then the resulting mixture is heated to fuse aggregated particles together.

Depending on the level the pH value adjusted, the proportion of the IA group elements (excluding hydrogen) is controlled to be in an intended range.

The pH value is adjusted by adding an acid or an alkali. The acid may be any acid and may be an aqueous solution of an inorganic acid, such as hydrochloric acid, nitric acid, or sulfuric acid, having a concentration of 0.1% or more and 50% or less. The alkali may be any alkali and may be an aqueous solution of a hydroxide of an alkali metal, such as sodium hydroxide or potassium hydroxide, having a concentration of 0.1% or more and 50% or less. In adjusting the pH value, if the pH value changes locally, local disruption of the aggregated particles and excessive local aggregation occur and the shape distribution is degraded. In particular, as the scale is increased, the amount of the acid and alkali used is increased. Typically, the acid and the alkali are injected from one location and thus the concentrations of the acid and alkali at that position of injection increase with the increase in scale, assuming that the process is conducted within the same amount of time.

In order to adjust the proportion of the IA group elements (excluding hydrogen) to be within the range of this exemplary embodiment, the pH value may be in the range of 6.0 or more and 8.0 or less, or may be in the range of 6.5 or more and 7.5 or less.

After the composition is controlled as described above, the aggregated particles are heated to be fused and united. During this heating process, the respective elements react with the terminals of the molecular chains of the resin so as to form a crosslinked structure.

Fusing involves fusing the aggregated particles by performing heating at a temperature equal to or higher than the glass transition temperature of the amorphous resin (or the melting temperature of the crystalline resin).

During or after completion of heating for fusion, crosslinking reaction may be conducted by using another component. Alternatively, the crosslinking reaction may be conducted along with fusion. When the crosslinking reaction is to be conducted, the crosslinking agent and the polymerization initiator described above are used in making the toner particles.

The polymerization initiator may be mixed with the raw material dispersion at the time the raw material dispersion is prepared or may be incorporated into aggregated particles during the aggregation step. Alternatively, the polymerization initiator may be introduced during or after the fusing step. When the polymerization initiator is to be introduced during the aggregation step, the attaching step, or the fusing step, or after the fusing step, a solution or an emulsion of the polymerization initiator is added to the dispersion. In order to control the degree of polymerization, a known crosslinking agent, a chain transfer agent, a polymerization inhibitor, and the like may be added to the polymerization initiator.

Washing and Drying Steps and Other Steps

After completion of the step of fusing and uniting the aggregated particles, a washing step, a solid-liquid separation step, a drying step, and the like may be performed, through which toner particles are obtained. In the washing step, displacement washing with ion exchange water may be performed considering the chargeability. The solid-liquid separation step is not particularly limited but suction filtration, compression filtration, or the like process may be performed from the viewpoint of productivity. The drying step is also not particularly limited but freeze drying, flash drying, fluidized bed drying, vibratory fluidized bed drying, or the like may be conducted. Various external additives may be added to the toner particles after drying.

The volume-average particle diameter D50v of the toner particles according to the exemplary embodiment may be in the range of 0.1 μm to 10 μm or may be in the range of 0.5 μm to 4 μm.

The volume-average particle size distribution index GSDv of the toner particles may be 1.28 or less. The number-average particle size distribution index GSDp may be 1.30 or less. Alternatively, the volume-average particle size distribution index GSDv may be 1.25 or less and the number-average particle size distribution index GSDp may be 1.25 or less.

In this exemplary embodiment, the volume-average particle diameter D50v and various particle size distribution indexes are measured with Multisizer 4e (produced by Beckman Coulter, Inc.) using ISOTON-II (produced by Beckman Coulter, Inc.) as the electrolyte. In the measurement, 0.5 μmg or more and 50 μmg of a measurement sample is added to 2 μmL of a surfactant, for example, a 5% aqueous solution of sodium alkyl benzenesulfonate, as a dispersant, and the resulting mixture is added to 100 μmL or more and 150 μmL or less of the electrolyte.

The electrolyte in which the sample is suspended is dispersed for 1 minute with an ultrasonic disperser and the particle size distribution of the particles having a particle diameter in the range of 0.2 μm to 60 μm is measured by using Multisizer 4e whose aperture diameter is adjusted to the diameters of the particles to be measured (10 μm or more and 100 μm or less). The number of the particles sampled is 50,000.

With respect to particle size ranges (channels) divided based on the particle size distributions measured as such, cumulative distributions are plotted for the volume and the number in the ascending order of the diameter. The particle diameters below which 16% of particles are included are assumed to be the cumulative volume-average particle diameter D16v and the cumulative number-average particle diameter D16p. The particle diameters below which 50% of particles are included are assumed to be the cumulative volume-average particle diameter D50v and the cumulative number-average particle diameter D50p. The particle diameters below which 84% of particles are included are assumed to be the cumulative volume-average particle diameter D84v and the cumulative number-average particle diameter D84p.

Based on these results, the volume-average particle size distribution index (GSDv) is determined by the formula $(D84v/D16v)^{1/2}$, and the number-average particle size distribution index (GSDp) is determined by the formula $(D84p/D16p)^{1/2}$.

The average circularity may be in the range of 0.940 or more and 0.980 or less or may be in the range of 0.950 or more and 0.970 or less.

The average circularity of the toner particles is measured with Flow Particle Image Analyzer FPIA-2000 (produced by Toa Medical Electronics Co., Ltd.). Specifically, to 100 mL to 150 mL of water from which impurity solid matter is preliminarily removed, 0.1 mL or more and 0.5 mL or less of a surfactant, for example, alkyl benzenesulfonate, serving as a dispersant is added, and then 0.1 g or more and 0.5 g or less of the sample is added thereto. The suspension in which the measurement sample is dispersed is dispersed for 1 minute to 3 minutes with an ultrasonic disperser and the average circularity of the toner particles is measured with the above-described device by assuming the dispersion concentration to be 3,000 particles/µL or more and 10,000 particles/µL or less.

The glass transition temperature (Tg) of the toner particles of the exemplary embodiment is not particularly limited and may be in the range of 40° C. or more and 90° C. or less.

The glass transition temperature (Tg) is measured according to ASTM D3418-8 by using an DSC meter (differential scanning calorimeter DSC-7, produced by PerkinElmer Co., Ltd.), for example. The temperature correction of the detector portion of the apparatus is done by using the melting temperatures of indium and zinc, and the correction of heat quantity is done by using heat of fusion of indium. The sample is measured in an aluminum pan at a heating rate of 10° C./min while using an empty pan as a reference.

Carrier Liquid

The carrier liquid will now be described in detail. The carrier liquid contains a dispersant according to the exemplary embodiment and an aliphatic hydrocarbon solvent as described above, and may further contain other components.

The dispersant content of the exemplary embodiment in the carrier liquid may be 0.0001% by mass or more and 10% by mass or less, 0.001% by mass or more and 5% by mass or less, or 0.01% by mass or more and 3% by mass or less from the viewpoints of dispersibility of the toner particles and adhesion of the fixed image to the recording medium.

The carrier liquid may be volatile or nonvolatile. The meaning of "nonvolatile" is that the flash point is 130° C. or higher or, the decrease in weight by evaporation after being held at 150° C. for 24 hours is 8% by mass or less. The flash point is measured according to Japanese Industrial Standards (JIS) K 2265-4 (2007).

The components that constitute the carrier liquid (components other than the dispersant of the exemplary embodiment) are described below.

Hydrocarbon Solvent

Examples of the hydrocarbon solvent include paraffin hydrocarbons, naphthenic hydrocarbons, and aromatic hydrocarbons.

Examples of the paraffin hydrocarbons include straight paraffins such as n-hexane, n-heptane, n-octane, n-nonane, n-decane, and n-dodecane, and branched paraffins such as isohexane.

Examples of the naphthenic hydrocarbons include cycloalkane-containing hydrocarbons such as cyclopentane, cyclohexane, and oleanane.

Examples of the aromatic hydrocarbons include benzene and toluene.

Examples of the hydrocarbon solvents other than those described above include polyol compounds such as ethylene glycol, halogenated hydrocarbons such as perchloroethylene, alcohol compounds such as 2-butanol, tetrahydrofuran, and acetone.

Examples of the commercially available paraffin hydrocarbons include MORESCO WHITE P-40, MORESCO WHITE P-55, MORESCO WHITE P-70, MORESCO WHITE P-100, MORESCO WHITE P-200, and MORESCO WHITE P-350P produced by MORESCO Corporation and ISOPAR L and ISOPAR M produced by Exxon Mobil Corporation.

Examples of the commercially available naphthenic hydrocarbons include EXXOL D80, EXXOL D110, and EXXOL D130 produced by Exxon Mobil Corporation, and Naphtesol L, Naphtesol M, Naphtesol H, New Naphtesol 160, New Naphtesol 200, New Naphtesol 220, and New Naphtesol MS-20P produced by JX Nippon Oil & Energy Corporation.

Hydrocarbon solvents may be used alone or in combination. From the viewpoints of damage on the recording medium (film attacking property), the carrier erasing property after image formation, and safety, an aliphatic hydrocarbon (for example, a paraffin hydrocarbon, a naphthenic hydrocarbon, an aliphatic polyol compound, an aliphatic halogenated hydrocarbon, or an aliphatic alcohol compound) may be used as the hydrocarbon solvent. In particular, a paraffin hydrocarbon or a branched paraffin may be used as the hydrocarbon solvent.

Other Components

The carrier liquid may also contain a non-hydrocarbon solvent. The non-hydrocarbon solvent content relative to the entire carrier liquid may be 49% by mass or less, may be 30% by mass or less, or may be zero.

Examples of the non-hydrocarbon solvent include silicone oil such as dimethyl silicone oil.

Examples of other components that may be contained in the carrier liquid include dispersants other than the dispersant of the exemplary embodiment, an emulsifier, a surfactant, a stabilizer, a humectant, a thickener, a foaming agent, a defoaming agent, a coagulant, a gelling agent, an antisettling agent, a charge controller, a charge inhibitor, an antioxidant, a softener, a filler, an oderant, an antitack agent, and a releasing agent.

Method for Producing Liquid Developer

The liquid developer according to the exemplary embodiment is obtained by mixing and disintegrating the above-described toner particles and carrier liquid, and, if needed, other additives by using a disperser such as a ball mill, a sand mill, an attritor, or a bead mill so as to disperse the toner particles in the carrier liquid.

Dispersing of the toner particles and the like in the carrier liquid is conducted not only with a disperser. For example, dispersing may be conducted by causing a special stirring blade to rotate at high speed such as by using a mixer. Alternatively, dispersing may be conducted through shear force of a rotor stator known as a homogenizer or by using ultrasonic waves.

The concentration of the toner particles in the carrier liquid may be in the range of 0.5% by mass or more and 40% by mass or less or may be in the range of 1% by mass or more and 30% by mass or less in order to control the viscosity of the developer to an appropriate level and facilitate circulation of the developer in the developing unit.

The obtained dispersion is filtered through a membrane filter having a pore diameter of 100 µm, for example, so as to remove foreign matter and coarse particles.

Liquid Developer Cartridge

The liquid developer cartridge according to the exemplary embodiment is a liquid developer cartridge that houses the liquid developer of the exemplary embodiment described above. For example, the liquid developer housed in the liquid developer cartridge is supplied to a developing unit of an image forming apparatus through a supply tube or the like. The liquid developer cartridge may be configured to be detachably attachable to an image forming apparatus so that the liquid developer cartridge can be replaced when it is empty. The shape of the liquid developer cartridge according to the exemplary embodiment is not particularly limited. The liquid developer cartridge may have a tank shape or a bottle shape. The shape of the liquid developer cartridge may be selected according to the volume of the liquid developer to be housed.

Image Forming Apparatus and Image Forming Method

The image forming apparatus according to this exemplary embodiment may be any image forming apparatus that uses the liquid developer of the exemplary embodiment described above. One example of the image forming apparatus is an image forming apparatus that includes an electrostatic latent image supporting body, a charging device that charges a surface of the electrostatic latent image supporting body, a latent image forming device that forms an electrostatic latent image on the surface of the electrostatic latent image supporting body, a developing device that stores the liquid developer according to the exemplary embodiment and that forms a toner image by developing the electrostatic latent image on the surface of the electrostatic latent image supporting body by using the liquid developer, a transfer device that transfers the toner image onto a recording medium, and a fixing device that fixes the toner image on the recording medium to the recording medium. An example of the fixing device is a fixing device that fixes the toner image to the recording medium by applying heat and pressure to the toner image on the recording medium.

The image forming method according to the exemplary embodiment may be any method that uses the liquid developer of the exemplary embodiment described above. For example, the method may include a charging step of charging a surface of an electrostatic latent image supporting body, a latent image forming step of forming an electrostatic latent image on the surface of the electrostatic latent image supporting body, a developing step of forming a toner image by developing the electrostatic latent image on the surface of the electrostatic latent image supporting body by using the liquid developer of the exemplary embodiment, a transfer step of transferring the toner image onto a recording medium, and a fixing step of fixing the toner image on the recording medium onto the recording medium. An example of the fixing step is a fixing step that involves applying heat and pressure to the toner image on the recording medium so as to fix the toner image to the recording medium.

In the image forming apparatus (image forming method) described above, the fixing device (fixing step) may involve two stages. Specifically, the fixing device (fixing step) may have a first heating device (first heating step) that heats the toner image in a non-contacting manner to a temperature equal to or higher than a temperature (A) at which the toner particles in the toner image exhibit a storage elastic modulus of $1 \times 10^6$ Pa and a second heating and pressurizing device (second heating and pressurizing step) that heats the toner image to a temperature equal to or higher than the temperature (A) after the heating with the first heating device (after the first heating step) while pressurizing the toner image.

In order to ensure flowability of the toner particles, the first heating device (first heating step) may heat the toner image in a non-contact manner (non-contact heater) from the toner-image-side of the recording medium and/or from the rear side of the recording medium (the side that does not have a toner image).

The recording medium used with the image forming apparatus (image forming method) of the exemplary embodiment may be any known recording medium. For example, a thermoplastic resin film may be used as the recording medium.

Examples of the thermoplastic resin film include polyolefin films such as polyethylene and polypropylene films; polyester films such as polyethylene terephthalate and polybutylene terephthalate films; and polyamide films such as nylon films. Other examples include polycarbonate, polystyrene, modified polystyrene, polyvinyl chloride, polyvinyl alcohol, and polylacetate films. These films may be unstretched, monoaxially, or biaxially stretched. The thermoplastic resin film may be a single-layer film or a multilayer film. If needed, a surface coating layer that assists fixing of the toner may be provided or plasma treatment or corona treatment may be performed on the film.

When a thermoplastic resin film is used as a recording medium, the thermoplastic resin film may be monoaxially or biaxially stretched from the viewpoint of reducing deformation of the thermoplastic resin film in forming the image by using the liquid developer of the exemplary embodiment. When the recording medium is a thermoplastic resin film for use in soft packaging materials, the thermoplastic resin film may be monoaxially or biaxially stretched in view of the properties required for the soft packaging materials. The thickness of the thermoplastic resin film for use in soft packaging materials is, for example, 5 µm or more and 250 µm or less and may be 10 µm or more and 100 µm or less. The thermoplastic resin film may be untreated. In order to enhance fixability of the image, the thermoplastic resin film may be subjected to a treatment for improving adhesion (for example, resin coating), such as a corona treatment, an ozone treatment, a low-temperature plasma treatment, a flame treatment, or a glow discharge treatment.

The thermoplastic resin film on which an image is to be formed may be at least one selected from a polyolefin film, a polyester film, and a polyamide film among the thermoplastic resin films described above, or may be at least one film selected from the group consisting of a polyethylene terephthalate film, a polypropylene film, and a nylon film. When the thermoplastic resin film is a multilayer film, the surface on which an image is to be formed may be formed of at least one thermoplastic resin film selected from a polyolefin film, a polyester film, and a polyamide film. Specifically, the surface may be formed of at least one selected from a polyethylene terephthalate film, a polypropylene film, and a nylon film or formed of at least one selected from a polyethylene terephthalate film and a polypropylene film.

The polyethylene terephthalate film, the polypropylene film, and the nylon film may be monoaxially or biaxially stretched.

The features of the image forming method and image forming apparatus of the exemplary embodiment will now be described in detail with reference to the drawings.

FIG. 1 is a schematic diagram illustrating one example of an image forming apparatus according to an exemplary embodiment.

An image forming apparatus 100 includes a photoreceptor (electrostatic latent image supporting body) 10, a charging device 20, an exposing device (latent image forming device) 12, a developing device 14, an intermediate transfer body 16, a cleaner 18, a transfer roller (transfer device) 28, a non-contact heating device (first heating device) 32, and heating and pressurizing rollers (second heating and pressurizing devices) 34A and 34B.

The photoreceptor 10 has a cylindrical shape. The charging device 20, the exposing device 12, the developing device 14, the intermediate transfer body 16, and the cleaner 18 are arranged along the outer circumference of the photoreceptor 10 in that order. The transfer roller 28 is located at a position at which a toner image 26 transferred to the intermediate transfer body 16 is transferred to a recording medium 30. The non-contact heating device (first heating device) 32 is disposed downstream of the transfer roller 28 in the direction of the movement of the recording medium 30. The heating and pressurizing rollers (second heating and pressurizing devices) 34A and 34B that form a pair are disposed downstream of the non-contact heating device 32 in the direction of the movement of the recording medium 30.

Operation of the image forming apparatus 100 will now be briefly described.

The charging device 20 charges a surface of the photoreceptor 10 to a predetermined potential. The charged surface is exposed by the exposing device 12, for example, with a laser beam, based on an image signal so as to form an electrostatic latent image.

The developing device 14 includes a developing roller 14a and a developer container 14b. The developing roller 14a is arranged so that a part thereof is in contact with a liquid developer 24 in the developer container 14b. Although the toner particles are in a dispersed state in the liquid developer 24, a stirring member may be provided in the developer container 14b so that the liquid developer 24 can be stirred.

The liquid developer 24 supplied to the developing roller 14a is transported to the photoreceptor 10 while being limited to a particular supply amount determined by a limiting member, and supplied to the electrostatic latent image at the position where the developing roller 14a faces (or contacts) the photoreceptor 10. As a result, the electrostatic latent image is developed to form a toner image 26.

The developed toner image 26 is transported by the photoreceptor 10 rotating in the arrow B direction in the figure and transferred onto the recording medium 30. In this exemplary embodiment, before the toner image is transferred to the recording medium 30, the toner image is transferred to the intermediate transfer body 16. During this process, there may be a difference in peripheral speed between the photoreceptor 10 and the intermediate transfer body 16.

Next, the toner image transported in the arrow C direction by the intermediate transfer body 16 is transferred to the recording medium 30 at the position where the recording medium 30 contacts the transfer roller 28.

The non-contact heating device (first heating device) 32 is disposed downstream of the transfer roller 28 in the direction of the movement of the recording medium 30. The non-contact heating device 32 is a plate-shaped heating device having a metal surface and a heater inside the plate. The toner image is heated at the position of the non-contact heating device 32 to a temperature equal to or higher than the temperature (A) at which the toner particles exhibit a storage elastic modulus of $1 \times 10^6$ Pa.

Examples of the heater used in the non-contact heating device 32 include a halogen heater and a hot air dryer if the toner image is to be heated in a non-contact manner from the toner image side; and a heating plate and a heating roller that contact the back of the toner image if the toner image is to be heated from the back (from the recording medium side) of the toner image.

The temperature to be reached by the non-contact heating device 32 may be 70° C. or higher. When a thermoplastic resin film is used as a recording medium, this temperature may be 70° C. or higher but lower than 110° C., 80° C. or higher or 100° C. or lower, or 80° C. or higher and 90° C. or lower. The heating time is determined based on the length of the non-contact heating device 32 in the direction of the movement of the recording medium 30 and the process speed.

The heating and pressurizing rollers (second heating and pressurizing devices) 34A and 34B are disposed downstream of the non-contact heating device (first heating device) 32 in the direction of the movement of the recording medium 30. The toner image heated by the non-contact heating device 32 is then pressurized and heated at a temperature equal to or higher than the temperature (A) described above by the heating and pressurizing rollers 34A and 34B. As a result, the toner image is fixed to the recording medium 30.

The heating and pressurizing rollers 34A and 34B are arranged to face each other so as to form a nip that holds the recording medium 30. The heating and pressurizing rollers 34A and 34B are each constituted by a metal roller, an elastic rubber layer on the metal roller, and a releasing layer, on the elastic rubber layer, for releasing the toner, and hold the recording medium 30 by a pressurizing mechanism (not shown) so that a predetermined pressure and a predetermined nip width are obtained. While at least one of the heating and pressurizing rollers 34A and 34B is equipped with a heater, both of the heating and pressurizing rollers 34A and 34B may be equipped with a heater.

The temperature to be reached by the heating and pressurizing rollers (second heating and pressurizing devices) 34A and 34B may be a temperature equal to or higher than the temperature (A) described above. When a thermoplastic resin film is used, this temperature may be 70° C. or higher but lower than 110° C., 800° C. or higher and 100° C. or lower, or 80° C. or higher and 90° C. or lower. The pressure applied may be 1.5 kg/cm$^2$ or more and 5 kg/cm$^2$ or less or may be 2 kg/cm$^2$ or more and 3.5 kg/cm$^2$ or less.

The toner image is fixed to the recording medium 30 at the position of the heating and pressurizing rollers 34A and 34B and forms a fixed image 29. Then the recording medium 30 is transported to a discharge unit not shown in the drawing.

Meanwhile, the photoreceptor 10 after the toner image 26 is transferred to the intermediate transfer body 16 carries the toner particles remaining untransferred on the photoreceptor 10 up to a position where the photoreceptor 10 contacts the cleaner 18, and the remaining toner particles are recovered by the cleaner 18. When the transfer efficiency is near 100% and little or no toner particles remain after the transfer, the cleaner 18 may be omitted.

The image forming apparatus 100 may further include a charge erasing device (not shown in the drawing) that erases charges on the surface of the photoreceptor 10 after transfer and before next charging.

The charging device 20, the exposing device 12, the developing device 14, the intermediate transfer body 16, the transfer roller 28, the cleaner 18, the non-contact heating device (first heating device) 32, and the heating and pressurizing rollers (second heating and pressurizing devices) 34A and 34B constituting the image forming apparatus 100 all operate in synchronization with the rotation speed of the photoreceptor 10.

Next, another example of the image forming apparatus of the exemplary embodiment is described in detail with reference to drawings.

Figure 2:
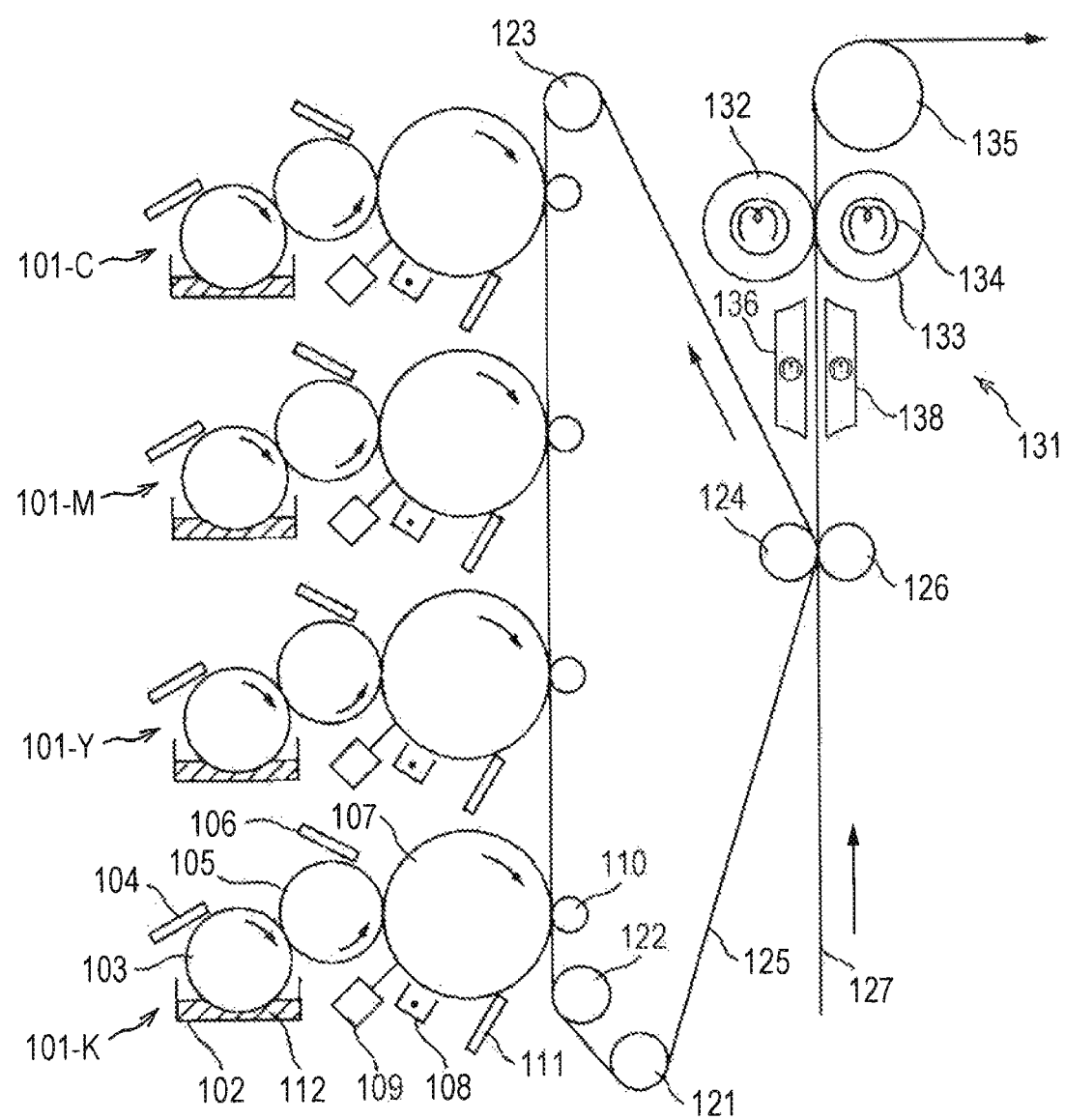
FIG. 2 is a schematic diagram illustrating another example of an image forming apparatus of an exemplary embodiment.

FIG. 2 is a schematic diagram illustrating another example of the image forming apparatus of the exemplary embodiment. This image forming apparatus has a tandem system.

The image forming apparatus illustrated in FIG. 2 includes a cyan developing unit 101-C, a magenta developing unit 101-M, a yellow developing unit 101-Y, and a black developing unit 101-K. Each developing unit includes a developer tank 102, a developer supply roller 103, a supply limiting unit 104, a developing roller (developing device) 105, a developing roller cleaner 106, a photoreceptor (electrostatic latent image supporting body) 107, a charging device 108, an exposing device (latent image forming device) 109, a first transfer device 110, and a photoreceptor cleaner 111. The image forming apparatus also includes an intermediate transfer body 125 that contacts the photoreceptors 107 of the four developing units, and second transfer devices 124 and 126 that transfer the toner image on the intermediate transfer body 125 onto a recording medium 127. A fixing unit (fixing device) 131 is disposed downstream of the second transfer devices 124 and 126 in the direction of the movement of the recording medium 127. A discharge roller 135 is disposed downstream of the fixing unit 131.

The fixing unit 131 includes non-contact heating devices (first heating devices) 136 and 138, and a heat roller 132 and a pressure roller 133 (second heating and pressurizing devices) arranged in that order from the upstream in the direction of the movement of the recording medium 127.

A predetermined amount of a liquid developer 112 is stored in the developer tank 102 by a developer circulating unit not shown in the drawing. The developer supply roller 103 transports the liquid developer 112 from the developer tank 102 to the developing roller 105. The developer supply roller 103 may be of a type that has a chargeable surface capable of electrostatically attracting the developer or of a type that transfers the developer by scooping the liquid with grooves or recesses formed in the roller, for example. The developer supply roller 103 is regulated by the supply limiting unit 104 so that a predetermined amount of the developer is transported. The photoreceptor 107 is charged by the charging device 108 so that the surface has a predetermined charge bias amount, and an electrostatic latent image is formed on the surface with a light beam from the exposing device 109 based on the image signal fed from a host computer not shown in the drawing. The liquid developer on the developing roller 105 migrates to the photoreceptor 107 according to the electrostatic latent image so as to form a toner image. The unused developer returns to the developer tank 102 through the developing roller cleaner 106 and the developer circulating unit not shown in the drawing.

The toner image formed on the photoreceptor 107 is transferred onto the intermediate transfer body 125 by the first transfer device 110. The intermediate transfer body 125 is supported by a driving roller 121, supporting rollers 122 and 123, and a second transfer device 124. The driving roller 121 drives the intermediate transfer body 125 in the arrow direction by a driving motor and a power transmission mechanism not shown in the drawing, and applies a predetermined tension to the intermediate transfer body 125 by a spring mechanism not shown in the drawing. The first transfer device 110 sequentially transfers cyan, magenta, yellow, and black toner images by electrostatic force and pressure onto the intermediate transfer body 125. The setting potential may be different among the first transfer devices 110 of the respective colors. The liquid developer remaining on the photoreceptor 107 is removed by the photoreceptor cleaner 111.

The toner images transferred onto the intermediate transfer body 125 are transferred to the recording medium 127 by the second transfer devices 124 and 126 and then fixed in the fixing unit 131.

The fixing unit 131 includes a first heating device and a second heating and pressurizing device in that order from the upstream side in the direction of the movement of the recording medium 127. The first heating device includes non-contact heating devices 136 and 138. The non-contact heating devices 136 and 138 are plate-shaped heating devices having a metal surface. A heater is installed inside the plate. The toner image is heated at the position of the non-contact heating devices 136 and 138 to a temperature equal to or higher than the temperature (A) at which the toner particles exhibit a storage elastic modulus of $1 \times 10^6$ Pa.

The temperature reached by the non-contact heating devices 136 and 138 may be 70° C. or higher. When a thermoplastic resin film is used as a recording medium, this temperature may be 70° C. or higher but less than 110° C., 80° C. or higher or 100° C. or lower, or 80° C. or higher and 90° C. or lower. The heating time is determined based on the lengths of the non-contact heating devices 136 and 138 in the direction of the movement of the recording medium 127 and the process speed.

The second heating and pressurizing device of the fixing unit 131 includes a heat roller 132 and a pressure roller 133 that form a pair and are each equipped with a heater 134 inside. The toner image heated by the non-contact heating devices 136 and 138 is further pressurized and heated to a temperature equal to or higher than the temperature (A) by the heat roller 132 and the pressure roller 133 that form a pair, and thereby fixed onto the recording medium 127.

The heat roller 132 and the pressure roller 133 are arranged to face each other so as to form a nip that holds the recording medium 127. The heat roller 132 and the pressure roller 133 are each formed of a metal roller, an elastic rubber layer on the metal roller, and a releasing layer, on the elastic rubber layer, for releasing toner particles, and hold the recording medium 127 by a pressurizing mechanism (not shown in the drawing) so that a predetermined pressure and a predetermined nip width are obtained. The heat roller 132 and the pressure roller 133 are both equipped with a heater; alternatively, only one of the heat roller 132 and the pressure roller 133 may be equipped with a heater.

The temperature to be reached by the heat roller 132 and the pressure roller 133 may be a temperature equal to or higher than the temperature (A) described above. When a thermoplastic resin film is used, this temperature may be 70° C. or higher but lower than 110° C., 80° C. or higher and 100° C. or lower, or 80° C. or higher and 90° C. or lower. The pressure applied may be 1.5 kg/cm² or more and 5 kg/cm² or less or may be 2 kg/cm² or more and 3.5 kg/cm² or less.

The discharge roller 135 is disposed downstream of the fixing unit 131, and the recording medium 127 to which the toner image is fixed is transported to the discharge unit (not shown) by the discharge roller 135.

Regarding the first heating device, FIG. 1 illustrates a plate-shaped heating device that heats the toner imager from the back side (side remote from the toner image) of the recording medium by a built-in heater and FIG. 2 illustrates a plate-shaped heating device that heats the toner image from both sides of the recording medium by built-in heaters in a non-contact manner. However, the type of the first heating device is not limited to this and the first heating device may be any member that can heat the front side (toner image side) of the recording medium in a non-contact manner. For example, heating may be conducted from only the front side (toner image side) of the recording medium by using a plate-shaped heating device having a built-in heater. Alternatively, a blower that blows hot air or an irradiator that emits infrared light may be used, for example.

Regarding the second heating and pressurizing devices, FIG. 1 illustrates the heating and pressurizing rollers 34A and 34B that form a pair and FIG. 2 illustrates the heat roller 132 and the pressure roller 133 that form a pair. However, the second heating and pressurizing devices are not limited to these. For example, a device that includes a heating and pressurizing roller and a pressurizing belt or a device that includes a pressurizing roller and a heating and pressurizing belt may be used.

The image forming apparatuses illustrated in FIGS. 1 and 2 may each be configured such that the liquid developer is supplied to the developer container 14b of the developer tank 102 from a liquid developer cartridge (not illustrated in the drawing) mounted onto the image forming apparatus. The liquid developer cartridge may be detachably attachable to the image forming apparatus so that the liquid developer cartridge is replaceable when empty.

EXAMPLES

The exemplary embodiments will now be described by Examples which do not limit the scope of the exemplary embodiments. In the description below, "parts" and "%" are all on a mass basis unless otherwise noted. The glass transition temperature (Tg), the volume-average particle diameter (D50v), the weight-average molecular weight, and the number-average molecular weight are the values measured by the methods (devices) described above.

Synthesis of Dispersant
Synthesis of Dispersant 1-1

In 89.78 parts of dimethylformamide, 7.83 parts of dipentaerythritol hexakis(3-mercaptopropionate) [DPMP, produced by Sakai Chemical Industry Co., Ltd.] and 6.18 parts of Example Compound (R1-12-4) below are dissolved. The resulting solution is heated under nitrogen stream to 70° C. To this solution, 0.06 parts of 2,2'-azobis(2,4-dimethylvaleronitrile) [V-65, produced by Wako Pure Chemical Industries, Ltd.] is added, and the resulting mixture is heated under nitrogen stream at 70° C. for 3 hours. To the resulting mixture, 0.06 parts of V-65 is added, and the reaction is performed for 3 hours at 70° C. under nitrogen stream. The resulting mixture is cooled to room temperature (25° C.). As a result, a 20% solution of a 1/5 adduct (an adduct in which Example Compound (R1-12-4) is added to 1/5 of the mercapto groups of DPMP) is obtained.

(R1-12-4)

A mixed solution containing 46.80 parts of the 20% solution of the 1/5 adduct, 1.00 part of methyl methacrylate, 17.00 parts of hexyl methacrylate, and 2.00 parts of diethylaminoethyl methacrylate is heated to 80° C. under nitrogen stream. To this mixture, 0.005 parts of 2,2'-azobis(isobutyronitrile) [AIBN, produced by Wako Pure Chemical Industries, Ltd.] is added and the resulting mixture is heated at 80° C. for 3 hours under nitrogen stream. Then 0.005 parts of AIBN is added again, and the resulting mixture is reacted at 80° C. for 3 hours under nitrogen stream. The resulting mixture is cooled to room temperature (25° C.) and diluted with acetone. Reprecipitation is conducted with a large quantity of methanol, and the precipitates are vacuum dried. As a result, 19 parts of solids of the following dispersant 1-1 (m=3.5, n=2.5, a1=10, b1=85, c1=5, weight-average molecular weight: 32,000) are obtained.

In the structural formula of the dispersant 1-1, m and n each represent the average number of groups bonded to X (number of groups per molecule) as with m and n in general formula (1), and a1, b1, and c1 represent the respective contents (% by mass) of the units as with a, b, and c in general formula (5).

Dispersant 1-1

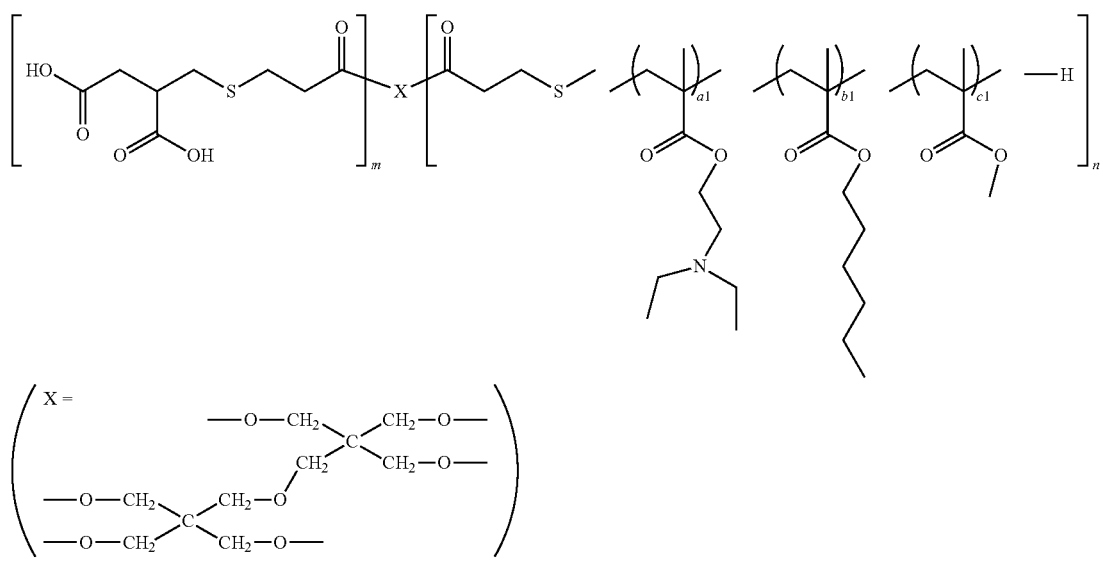

Synthesis of Dispersant 1-2

In 89.78 parts of dimethylformamide, 7.83 parts of dipentaerythritol hexakis(3-mercaptopropionate) [DPMP, produced by Sakai Chemical Industry Co., Ltd.] and 6.18 parts of Example Compound (R1-12-4) described below are dissolved. The resulting solution is heated to 70° C. under nitrogen stream. To this solution, 0.06 parts of 2,2'-azobis (2,4-dimethylvaleronitrile) [V-65, produced by Wako Pure Chemical Industries, Ltd.] is added, and the resulting mixture is heated under nitrogen stream at 70° C. for 3 hours. To the resulting mixture, 0.06 parts of V-65 is further added, and the reaction is performed for 3 hours at 70° C. under nitrogen stream. The resulting mixture is cooled to room temperature (25° C.). As a result, a 20% solution of a 1/5 adduct (an adduct in which Example Compound (R1-12-4) is added to 1/5 of the mercapto groups of DPMP) is obtained.

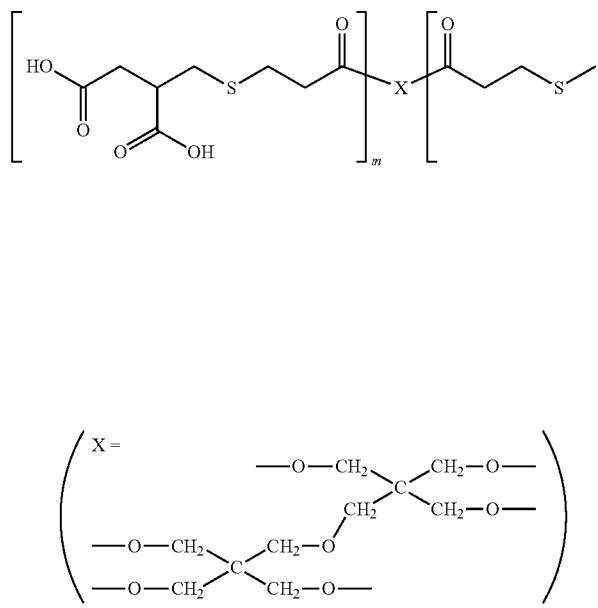

(R1-12-4)

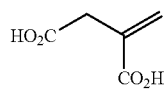

A mixed solution containing 46.80 parts of the 20% solution of the 1/5 adduct, 1.00 part of methyl methacrylate, 17.00 parts of hexyl methacrylate, and 2.00 parts of Example Compound (2-1-2) described below is heated to 80° C. under nitrogen stream. Thereto, 0.005 parts of 2,2'-azobis(isobutyronitrile) [AIBN, produced by Wako Pure Chemical Industries, Ltd.] is added and the resulting mixture is heated at 80° C. for 3 hours under nitrogen stream. Then 0.005 parts of AIBN is added again, and the resulting mixture is reacted at 80° C. for 3 hours under nitrogen stream. The resulting mixture is cooled to room temperature (25° C.) and diluted with acetone. Reprecipitation is conducted with a large quantity of methanol, and the precipitates are vacuum dried. As a result, 20 parts of solids of the following dispersant 1-2 (m=3.5, n=2.5, a1=10, b1=85, c1=5, weight-average molecular weight: 67,400) are obtained.

In the structural formula of the dispersant 1-2, m and n each represent the average number of groups bonded to X (number of groups per molecule) as with m and n in general formula (1), and a1, b1, and c1 represent the respective contents (% by mass) of the units as with a, b, and c in general formula (5).

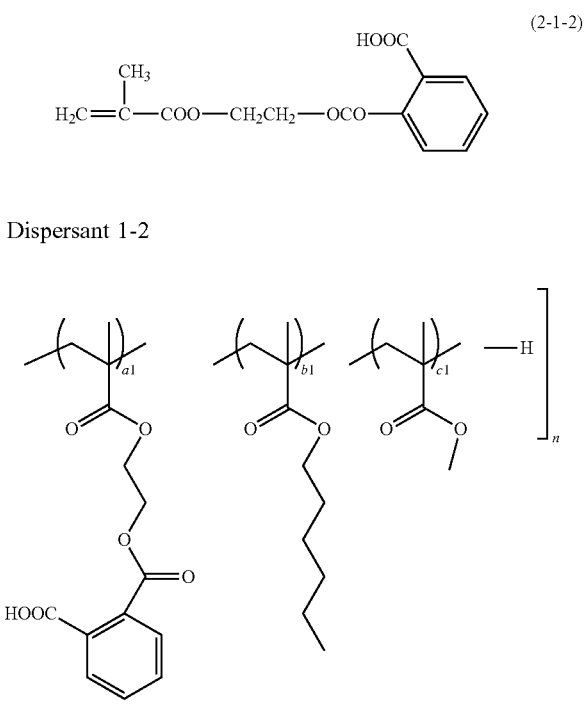

(2-1-2)

Dispersant 1-2

Synthesis of Dispersant 1-3

In 89.78 parts of dimethylformamide, 7.83 parts of dipentaerythritol hexakis (3-mercaptopropionate) [DPMP, produced by Sakai Chemical industry Co., Ltd.] and 6.18 parts of Example Compound (R1-12-4) described below are dissolved. The resulting solution is heated to 70° C. under nitrogen stream. To this solution, 0.06 parts of 2,2'-azobis (2,4-dimethylvaleronitrile) [V-65, produced by Wako Pure Chemical Industries, Ltd.] is added, and the resulting mixture is heated under nitrogen stream at 70° C. for 3 hours. To the resulting mixture, 0.06 parts of V-65 is further added, and the reaction is performed for 3 hours at 70° C. under nitrogen stream. The resulting mixture is cooled to room temperature (25° C.). As a result, a 20% solution of a 1/5 adduct (an adduct in which Example Compound (R1-12-4) is added to 1/5 of the mercapto groups of DPMP) is obtained.

(R1-12-4)

A mixed solution containing 46.80 parts of the 20% solution of the 1/5 adduct, 1.00 part of methyl methacrylate, 17.00 parts of hexyl methacrylate, and 2.00 parts of Example Compound (2-1-8) described below is heated to 80° C. under nitrogen stream. Thereto, 0.005 parts of 2,2'-azobis(isobutyronitrile) [AIBN, produced by Wako Pure Chemical Industries, Ltd.] is added and the resulting mixture is heated at 80° C. for 3 hours under nitrogen stream. Then 0.005 parts of AIBN is added again, and the resulting mixture is reacted at 80° C. for 3 hours under nitrogen stream. The resulting mixture is cooled to room temperature (25° C.) and diluted with acetone. Reprecipitation is conducted with a large quantity of methanol, and the precipitates are vacuum dried. As a result, 20 parts of solids of the following dispersant 1-3 (m=3.5, n=2.5, a1=10, b1=85, c1=5, weight-average molecular weight: 67,500) are obtained.

In the structural formula of the dispersant 1-3, m and n each represent the average number of groups bonded to X (number of groups per molecule) as with m and n in general formula (1), and a1, b1, and c1 represent the respective contents (% by mass) of the units as with a, b, and c in general formula (5).

(2-1-8)

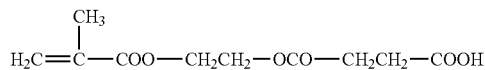

Dispersant 1-3

The resulting mixture is cooled to room temperature (25° C.). As a result, a 20% solution of a 1/5 adduct (an adduct in which Example Compound (R1-12-4) is added to 1/5 of the mercapto groups of DPMP) is obtained.

(R1-12-4)

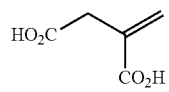

A mixed solution containing 46.80 parts of the 20% solution of the 1/5 adduct, 1.00 part of methyl methacrylate, 17.00 parts of hexyl methacrylate, and 2.00 parts of Example Compound (2-1-14) described below is heated to 80° C. under nitrogen stream. Thereto, 0.005 parts of 2,2'-azobis(isobutyronitrile) [AIBN, produced by Wako Pure Chemical industries, Ltd.] is added and the resulting mixture is heated at 80° C. for 3 hours under nitrogen stream. Then 0.005 parts of AIBN is added again, and the resulting mixture is reacted at 80° C. for 3 hours under nitrogen stream. The resulting mixture is cooled to room temperature (25° C.) and diluted with acetone. Reprecipitation is conducted with a large quantity of methanol, and the precipitates are vacuum dried. As a result, 20 parts of solids of the following dispersant 1-4 (m=3.5, n=2.5, a1=10, b1=85, c1=5, weight-average molecular weight: 51,900) are obtained.

In the structural formula of the dispersant 1-4, m and n each represent the average number of groups bonded to X

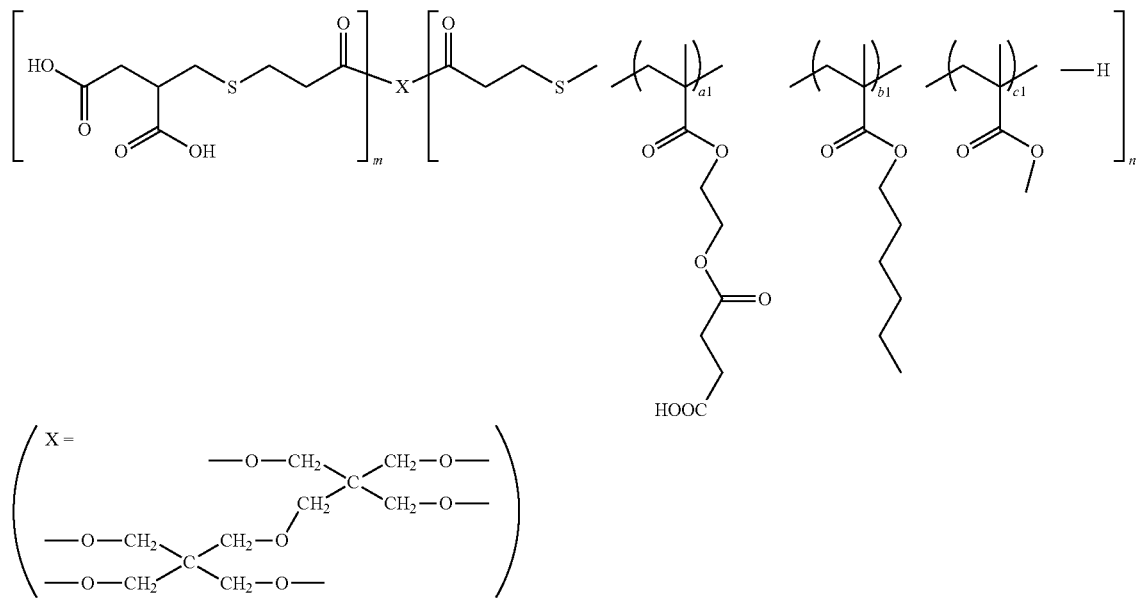

Synthesis of Dispersant 1-4

In 89.78 parts of dimethylformamide, 7.83 parts of dipentaerythritol hexakis(3-mercaptopropionate) [DPMP, produced by Sakai Chemical Industry Co., Ltd.] and 6.18 parts of Example Compound (R1-12-4) below are dissolved, and the resulting solution is heated to 70° C. under nitrogen stream. To this solution, 0.06 parts of 2,2'-azobis(2,4-dimethylvaleronitrile) [V-65, produced by Wako Pure Chemical Industries, Ltd.] is added, and the resulting mixture is heated under nitrogen stream at 70° C. for 3 hours. To the resulting mixture, 0.06 parts of V-65 is further added, and the reaction is performed for 3 hours at 70° C. under nitrogen stream.

(number of groups per molecule) as with m and n in general formula (1), and a1, b1, and c1 represent the respective contents (% by mass) of the units as with a, b, and c in general formula (5).

(2-1-14)

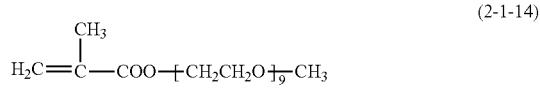

Synthesis of Dispersant 1-4

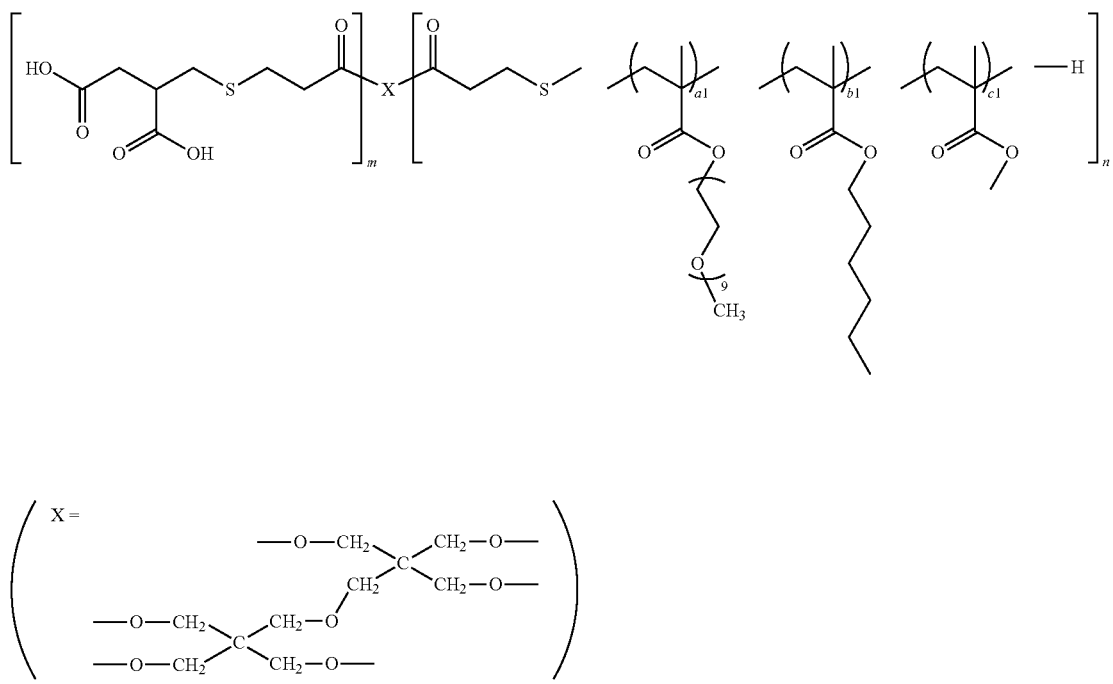

Synthesis of Dispersant 1-9

In 89.78 parts of dimethylformamide, 7.83 parts of dipentaerythritol hexakis(3-mercaptopropionate) [DPMP, produced by Sakai Chemical Industry Co., Ltd.] and 6.18 parts of Example Compound (R1-12-4) below are dissolved, and the resulting solution is heated to 70° C. under nitrogen stream. To this solution, 0.06 parts of 2,2'-azobis(2,4-dimethylvaleronitrile) [V-65, produced by Wako Pure Chemical Industries, Ltd.] is added, and the resulting mixture is heated under nitrogen stream at 70° C. for 3 hours. Thereto, 0.06 parts of V-65 is further added, and the resulting mixture is reacted at 70° C. for 3 hours under nitrogen stream and cooled to room temperature (25° C.). As a result, a 20% solution of a 1/5 adduct (an adduct in which Example Compound (R1-12-4) is added to 1/5 of the mercapto groups of DPMP) is obtained.

(R1-12-4)

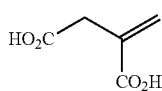

A mixed solution containing 46.80 parts of the 20% solution of the 1/5 adduct, 1.00 part of methyl methacrylate, 15.00 parts of hexyl methacrylate, 2.00 parts of N,N-diethylaminoethyl methacrylate, and 2.00 parts of Example Compound (2-1-2) described below is heated to 80° C. under nitrogen stream. Thereto, 0.005 parts of 2,2'-azobis(isobutyronitrile) [AIBN, produced by Wako Pure Chemical Industries, Ltd.] is added and the resulting mixture is heated at 80° C. for 3 hours under nitrogen stream. Then 0.005 parts of AIBN is added again, and then the reaction is conducted at 80° C. for 3 hours under nitrogen stream. The resulting mixture is cooled to room temperature (25° C.) and diluted with acetone. Reprecipitation is conducted with a large quantity of methanol, and the precipitates are vacuum dried. As a result, 15 parts of solids of the following dispersant 1-9 (m=3.5, n=2.5, a1=0, a2=10, b1=75, c1=5, weight-average molecular weight: 63,100) are obtained.

In the structural formula of the dispersant 1-9, m and n each represent the average number of groups bonded to X (number of groups per molecule) as with m and n in general formula (1), and a1, a2, b1, and c1 represent the respective contents (% by mass) of the units as with a, b, and c in general formula (5).

(2-1-2)

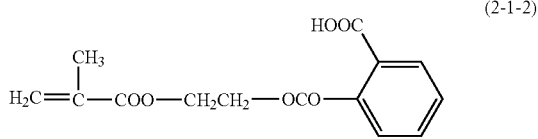

Dispersant 1-9

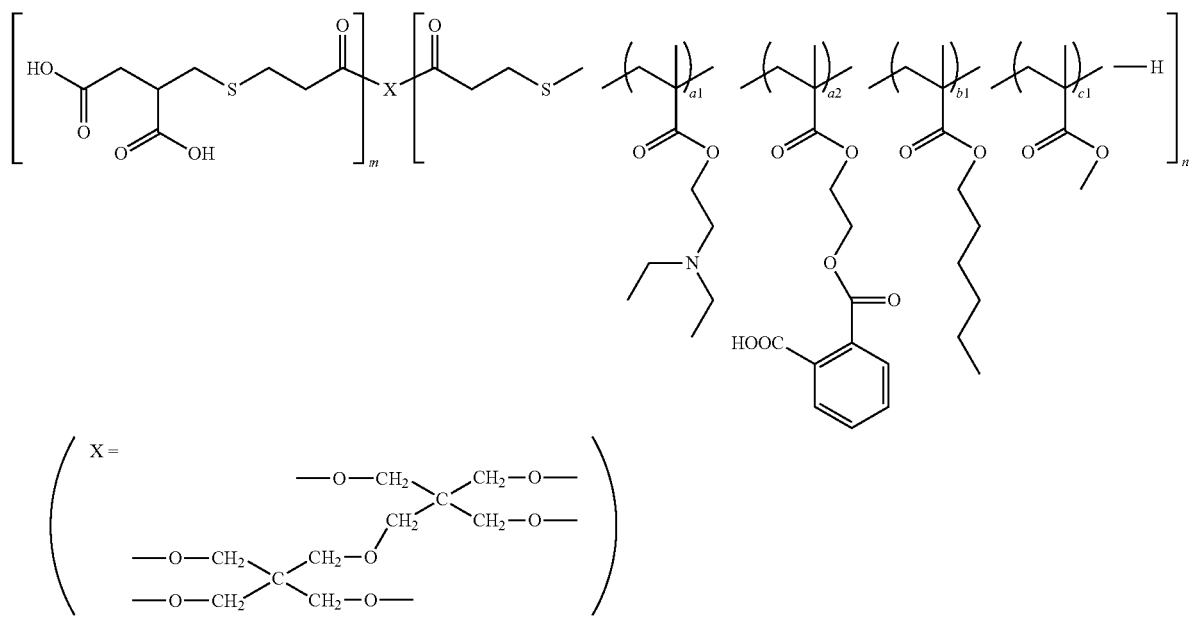

Synthesis of Dispersant 1-21

A dispersant 1-21 (m=3.5, n=2.5, a1=10, b1=85, c1=5, weight-average molecular weight: 33,100) is obtained as with the dispersant 1-1 except that 6.18 parts of Example Compound (R1-13-1; below is used instead of 6.18 parts of Example Compound (R1-12-4).

In the structural formula of the dispersant 1-21 below, m and n each represent the average number of groups bonded to X (number of groups per molecule) as with m and n in general formula (1), and a1, b1, and c1 represent the respective contents (% by mass) of the units as with a, b, and c in general formula (5).

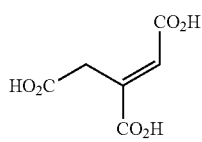

(R1-13-1)

Dispersant 1-21

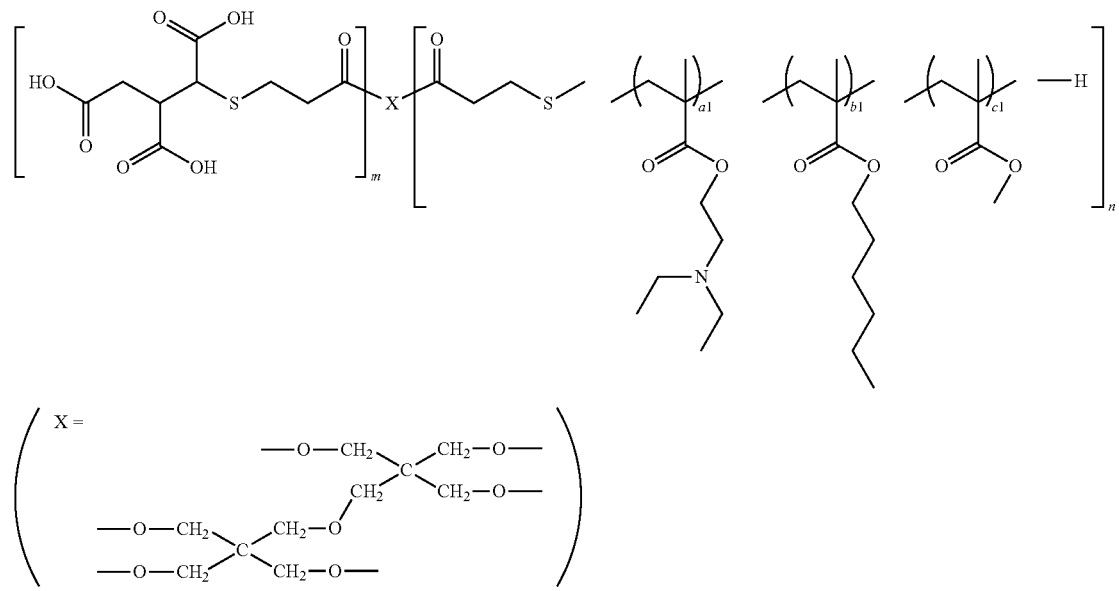

Preparation of Liquid Developers

Preparation of Liquid Developer 1

Polyoxyethylene (2.2)-2,2-bis(4-hydroxyphenyl)propane: 0.7 mol

Polyoxypropylene (2.2)-2,2-bis(4-hydroxyphenyl)propane: 1.6 mol

Terephthalic acid: 1.4 mol n-Dodecenylsuccinic acid: 0.9 mol

The raw material compounds described above are placed in a 2 L four-necked glass flask. A stirring rod, a condenser, a nitrogen gas inlet tube, and a thermometer are attached to the flask. The flask is loaded in a mantle heater. After the interior of the reactor is purged with nitrogen gas, 1 g of dibutyl tin oxide is added, and the resulting mixture is reacted at 180° C. in the first half period and then at 220° C. under a reduced pressure in the second half period while the mixture is being heated with the mantle heater under nitrogen stream. The degree of polymerization is tracked by a ring-and-ball softening point determination method (JIS-K 2531) and the reaction is terminated when the softening point reaches 140° C. After completion of the reaction, the reaction solution is cooled to room temperature (25° C.)

The obtained resin (hereinafter referred to as a polyester resin 1) has a glass transition temperature Tg of 67° C. and a number-average molecular weight (Mn) of 5,000.

A blend of 70 parts by mass of the polyester resin 1 and 30 parts by mass of a cyan pigment, C.I. Pigment Blue 15:3 (produced by Clariant) is kneaded with a pressure kneader. The kneaded product is ground with a jet mill to obtain cyan particles having an average particle diameter of 10 μm.

To 35 parts by mass of these cyan particles, 103 parts by mass of a volatile paraffin oil, isopar L, and 0.5 parts by mass of the dispersant 1-1 obtained are added. The resulting mixture is ground with a ball mill. As a result, a liquid developer 1 containing toner particles having a volume-average particle diameter D50v of 1.1 μm is obtained.

Preparation of Liquid Developer 2

A liquid developer 2 is obtained as with the liquid developer 1 except that 0.5 parts by mass of the dispersant 1-2 is used instead of 0.5 parts by mass of the dispersant 1-1.

Preparation of Liquid Developer 3

A liquid developer 3 is obtained as with the liquid developer 1 except that 0.5 parts by mass of the dispersant 1-3 is used instead of 0.5 parts by mass of the dispersant 1-1.

Preparation of Liquid Developer 4

A liquid developer 4 is obtained as with the liquid developer 1 except that 0.5 parts by mass of the dispersant 1-4 is used instead of 0.5 parts by mass of the dispersant 1-1.

Preparation of Liquid Developer 5

A liquid developer 5 is obtained as with the liquid developer 1 except that 0.5 parts by mass of the dispersant 1-9 is used instead of 0.5 parts by mass of the dispersant 1-1.

Preparation of Liquid Developer 6

A liquid developer 6 is obtained as with the liquid developer 1 except that 0.5 parts by mass of the dispersant 1-21 is used instead of 0.5 parts by mass of the dispersant 1-1.

Preparation of Liquid Developer C1

A liquid developer C1 is obtained as with the liquid developer 1 except that 0.2 parts by mass of Solsperse 13940 (produced by the Lubrizol Corporation) is used instead of 0.5 parts by mass of the dispersant 1-1.

Preparation of Evaluation Samples

A polyethylene terephthalate film (ESPET Film T4102 produced by TOYOBO CO., LTD.) is prepared as the recording medium (substrate film).

A coating film is formed on each recording medium by using a liquid developer and a bar coater so that the mass of the toner particles (TMA) and the mass of the carrier liquid (CMA) in the liquid developer are 3.5 g/m$^2$ and 4.8 g/m$^2$, respectively, and the coating area is 8 cm×5 cm (excess is removed with waste cloth).

Then a fixed image is formed on the recording medium under fixing conditions that involve first-stage non-contact pre-heating at 60° C., placing the same film as the substrate film on the recording medium, and second-stage heating and pressurizing at 120° C., 2.7 kg/cm$^2$, and a rate of 60 m/min by using a pair of fixing rollers. The resulting product is assumed to be an evaluation sample A.

A biaxially stretched polypropylene film (FOR (thickness: 15) produced by FUTAMURA CHEMICAL CO., LTD.) is prepared as a recording medium (substrate film).

A fixed image is formed on the recording medium by using a liquid developer as in preparing the evaluation sample A except that the above-described polypropylene film is used as the recording medium and that the fixing temperature employed in the second stage is changed to 95° C. The resulting product is assumed to an evaluation sample B.

In sum, the substrate film (recording medium) of the evaluation sample prepared by using the liquid developer, and the second-stage fixing temperature are as follows.

Sample A: polyethylene terephthalate film, second stage fixing temperature: 120° C.

Sample B: biaxially stretched polypropylene film, second stage fixing temperature: 95° C.

Evaluation

The evaluation samples described above are evaluated as follows.

Evaluation of Adhesion Strength (Peel Strength) of Toner Image

Each evaluation sample obtained as such is subjected to a 90° peel test with a peel tester (Strograph produced by Toyo Seiki Seisaku-Sho, Ltd.) at room temperature (25° C.), a tensile rate of 300 mm/min, and a peel distance of 50 mm. The average of the load is assumed to be the peel strength. The results are indicated in Table 4.

Evaluation of Dispersibility of Toner Particles in Carrier Liquid

For each liquid developer obtained, dispersibility of the toner particles is evaluated by visual observation and magnifying observation. The samples are evaluated according to the following standard. Evaluation is conducted after a mixture of the toner particles and the carrier liquid is left to stand for 1 hour. The results are indicated in Table 4.

Dispersed: Toner particles are evenly dispersed in visual observation and magnifying observation.

Aggregated: Coarse particles are observed under visual observation.

Separated: The carrier liquid and the toner particles are completely separated under visual observation.

TABLE 4

|  | Dispersant | Liquid developer | Evaluation sample A, PET base (N/15 mm) | Evaluation sample B, OPP base (N/15 mm) | Evaluation of dispersibility |
|---|---|---|---|---|---|
| Example 1 | 1-1 | 1 | 1.4 | 2.4 | Dispersed |
| Example 2 | 1-2 | 2 | 1.0 | 2.7 | Dispersed |
| Example 3 | 1-3 | 3 | 0.7 | 1.5 | Dispersed |
| Example 4 | 1-4 | 4 | 1.1 | 2.4 | Dispersed |
| Example 5 | 1-9 | 5 | 0.7 | 1.5 | Dispersed |
| Example 6 | 1-21 | 6 | 1.8 | 2.6 | Dispersed |
| Comparative Example 1 | Solsperse 13940 | C1 | 0.1 | 0.9 | Dispersed |

The results demonstrate that Examples perform better in terms of toner image adhesion strength than Comparative Example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A dispersant for liquid development represented by general formula (1) below:

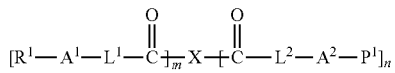

General formula (1)

wherein, in general formula (1), $R^1$ represents a monovalent organic group having a polar group, $A^1$ and $A^2$ each independently represent an oxygen atom or a sulfur atom, $L^1$ and $L^2$ each independently represent a divalent organic linking group, X represents a (m+n)-valent organic linking group having an alkyleneoxy group, $P^1$ represents a polymer chain that contains a unit represented by general formula (2) below, m represents a number of 1 or more and 9 or less, n represents a number of 1 or more and 9 or less, and m+n is an integer of 2 or more and 10 or less:

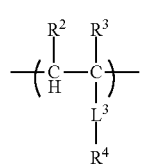

General formula (2)

wherein, in general formula (2), $R^2$ and $R^3$ each independently represent a hydrogen atom or a methyl group, $L^3$ represents a carbonyloxy group, an oxycarbonyl group, a carbonyl group, an ether bond, or a phenylene group, and $R^4$ represents a monovalent organic group that has a group represented by structural formula (R4) below:

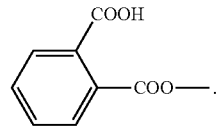

Structural formula (R4)

2. The dispersant for liquid development according to claim 1, wherein the polymer chain represented by $P^1$ in general formula (1) further contains a unit represented by general formula (3) below:

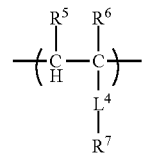

General formula (3)

wherein, in general formula (3), $R^5$ and $R^6$ each independently represent a hydrogen atom or a methyl group, $L^4$ represents a carbonyloxy group, an oxycarbonyl group, a carbonyl group, an ether bond, or a phenylene group, and $R^7$ represents an alkyl group having 3 to 20 carbon atoms.

3. The dispersant for liquid development according to claim 1, wherein $R^1$ in general formula (1) represents a monovalent organic group having two or more carboxy groups.

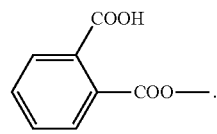

4. The dispersant for liquid development according to claim 1, wherein $R^1$ contains at least one group selected from the group consisting of groups represented by general formulae (R1-1), (R1-2), and (R1-3):

$F^{R11}\text{-}L^{R11}\text{-}*$     General formula (R1-1)

wherein, in general formula (R1-1), $F^{R11}$ represents a polar group, $L^{R11}$ represents a divalent organic linking group, and * indicates a position where the group is bonded to $A^1$ in general formula (1);

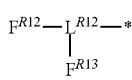

General formula (R1-2)

wherein, in general formula (R1-2), $F^{R12}$ and $F^{R13}$ each independently represent a polar group, $L^{R12}$ represents a trivalent organic linking group having 2 or more carbon atoms, and * indicates a position where the group is bonded to $A^1$ in general formula (1); and

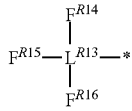

General formula (R1-3)

wherein, in general formula (R1-3), a polar group represented by $F^{R14}$, a polar group represented by $F^{R15}$, and a polar group represented by $F^{R16}$ are directly bonded to different carbon atoms among carbon atoms of an organic linking group represented by $L^{R13}$.

5. The dispersant for liquid development according to claim 4, wherein the divalent organic linking group represented by $L^{R11}$ in general formula (R1-1) contains at least one group selected from a straight alkylene group, a branched alkylene group, a cycloalkylene group having 3 to 10 carbon atoms, and an arylene group having 6 to 10 carbon atoms.

6. The dispersant for liquid development according to claim 4, wherein the divalent organic linking group represented by $L^{R11}$ is a hydrocarbon group having 1 to 20 carbon atoms.

7. The dispersant for liquid development according to claim 4, wherein the divalent organic linking group represented by $L^{R12}$ in general formula (R1-2) is a hydrocarbon group having 2 to 20 carbon atoms.

8. The dispersant for liquid development according to claim 4, wherein the divalent organic linking group represented by $L^{R13}$ in general formula (R1-3) is a hydrocarbon group having 3 to 20 carbon atoms.

9. The dispersant for liquid development according to claim 1, wherein the divalent organic linking group represented by $L^1$ is a hydrocarbon group having 2 to 20 carbon atoms.

10. The dispersant for liquid development according to claim 1, wherein the divalent organic linking group represented by $L^1$ is a straight alkylene group.

11. The dispersant for liquid development according to claim 1, wherein $L^1$ and $L^2$ represent the same group.

12. The dispersant for liquid development according to claim 1, wherein m and n each represent a number of 2 or more and 7 or less.

13. The dispersant for liquid development according to claim 1, wherein m+n is 5 or more and 9 or less.

14. The dispersant for liquid development according to claim 1, wherein the unit represented by general formula (2) is a unit formed by polymerizing a monomer represented by general formula (2-1) below:

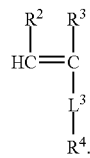

General formula (2-1)

15. The dispersant for liquid development according to claim 1, wherein the dispersant has a weight-average molecular weight of about 1,000 or more and about 1,000,000 or less.

16. A liquid developer comprising:
toner particles; and
a carrier liquid containing the dispersant for liquid development according to claim 1 and a hydrocarbon solvent.

17. The liquid developer according to claim 16, wherein the toner particles contain a crystalline resin.

18. The liquid developer according to claim 17, wherein the crystalline resin has a number-average molecular weight (Mn) of about 2,000 or more.

19. The liquid developer according to claim 17, wherein the toner particles have a glass transition temperature of about 50° C. or higher and about 80° C. or lower.

20. A liquid developer cartridge detachably attachable to an image forming apparatus, comprising the liquid developer according to claim 16.

* * * * *